US012760825B2

(12) United States Patent
Cao et al.

(10) Patent No.: US 12,760,825 B2
(45) Date of Patent: Oct. 13, 2026

(54) BREAKAWAY VALVE FOR A CRYOGENIC FLUID TANK

(71) Applicant: Engineered Controls International, LLC, Elon, NC (US)

(72) Inventors: Guangbin Cao, Shanghai (CN); John Grenaway, Huntersville, NC (US)

(73) Assignee: Engineered Controls International, LLC, Elon, NC (US)

( * ) Notice: Subject to any disclaimer, the term of this patent is extended or adjusted under 35 U.S.C. 154(b) by 190 days.

(21) Appl. No.: 18/707,769

(22) PCT Filed: Oct. 17, 2022

(86) PCT No.: PCT/CN2022/125644

§ 371 (c)(1),
(2) Date: May 6, 2024

(87) PCT Pub. No.: WO2023/088010

PCT Pub. Date: May 25, 2023

(65) Prior Publication Data

US 2026/0071707 A1 Mar. 12, 2026

(30) Foreign Application Priority Data

Nov. 18, 2021 (WO) ................ PCT/CN2021/131494

(51) Int. Cl.
*F16L 37/32* (2006.01)
*B67D 7/32* (2010.01)
(Continued)

(52) U.S. Cl.
CPC ............... *F16L 37/32* (2013.01); *F16L 37/14* (2013.01); *F17C 13/04* (2013.01); *B67D 7/3218* (2013.01);
(Continued)

(58) Field of Classification Search
CPC .... B67D 7/3218; F16L 37/32; F16L 55/1007; F16L 55/1015; Y10T 137/1662; Y10T 137/87957
See application file for complete search history.

(56) References Cited

U.S. PATENT DOCUMENTS 3,719,194 A * 3/1973 Anderson ........... F16L 55/1015 137/68.14
4,646,773 A 3/1987 Klop et al.
(Continued)

FOREIGN PATENT DOCUMENTS

CN 202484119 10/2012
CN 103027373 4/2013
(Continued)

OTHER PUBLICATIONS

CN103027373 Translation. Printed Jan. 2026.*
(Continued)

*Primary Examiner* — Robert K Arundale
(74) *Attorney, Agent, or Firm* — Neal, Gerber & Eisenberg LLP

(57) ABSTRACT

An example breakaway valve for a cryogenic fluid tank includes a first valve and a second valve. The first valve includes a first valve body that defines through-holes and notches along a distal edge. The second valve includes a second valve body that defines a first set of blind holes and a second set of blind holes. Shear pins are configured to extend through the through-holes and into the first set of blind holes. The shear pins are configured to shear apart when at least a predetermined axial force is applied. Anti-rotation pins are configured to extend through the notches and into the second set of blind holes. The anti-rotation pins are configured to withstand up to at least a predetermined torsional force to deter the second valve from separating
(Continued)

from the first valve prior to at least the predetermined axial force is applied.

18 Claims, 29 Drawing Sheets

(51) Int. Cl.

| | |
|---|---|
| ***F16L 37/14*** | (2006.01) |
| ***F16L 55/10*** | (2006.01) |
| ***F17C 13/04*** | (2006.01) |

(52) U.S. Cl.
CPC ....... *F16L 55/1007* (2013.01); *F16L 55/1015* (2013.01); *F16L 2201/20* (2013.01); *F17C 2205/0323* (2013.01); *F17C 2205/037* (2013.01); *F17C 2223/0161* (2013.01); *Y10T 137/1662* (2015.04); *Y10T 137/87957* (2015.04)

(56) References Cited

U.S. PATENT DOCUMENTS

| | | | | |
|---|---|---|---|---|
| 4,674,525 | A | | 6/1987 | Richards et al. |
| 4,763,683 | A | | 8/1988 | Carmack |
| 4,998,560 | A | | 3/1991 | Le Devehat |
| 5,054,509 | A | | 10/1991 | Grantham |
| 5,135,029 | A | | 8/1992 | Anderson et al. |
| 5,200,015 | A | | 4/1993 | Schilf |
| 5,529,085 | A | * | 6/1996 | Richards ............. F16L 55/1007 137/68.15 |
| 6,533,334 | B1 | | 3/2003 | Bonn |
| 8,517,749 | B2 | | 8/2013 | Marshall |
| 10,184,569 | B2 | | 1/2019 | Thomas et al. |
| 2004/0123899 | A1 | | 7/2004 | Turvey |
| 2008/0035222 | A1 | | 2/2008 | Fraser |
| 2009/0102182 | A1 | | 4/2009 | Gazewood |
| 2009/0123221 | A1 | | 5/2009 | Marshall |
| 2014/0116515 | A1 | | 5/2014 | Konishi |
| 2014/0311579 | A1 | | 10/2014 | Nanaji |

FOREIGN PATENT DOCUMENTS

| | | |
|---|---|---|
| CN | 107041151 | 8/2017 |
| CN | 212479160 | 2/2021 |
| GB | 1399059 | 6/1975 |
| GB | 1567373 | 5/1980 |
| JP | S57103719 | 6/1982 |

OTHER PUBLICATIONS

International Search Report and Written Opinion for PCT/CN2021/131494 dated Aug. 16, 2022, 9 pp.
International Search Report and Written Opinion for PCT/CN2022/125644 dated Dec. 15, 2022, 9 pp.

* cited by examiner

BREAKAWAY VALVE FOR A CRYOGENIC FLUID TANK

CROSS-REFERENCE TO RELATED APPLICATION

This application is a national-stage entry of International Patent Application No. PCT/CN2022/125644, filed on Oct. 17, 2022, which claims priority to International Patent Application No. PCT/CN2021/131494, filed on Nov. 18, 2021, both of which are incorporated herein by reference in their entirety.

TECHNICAL FIELD

This disclosure generally relates to cryogenic fluid tanks and, more particularly, to breakaway valves for cryogenic fluid tanks.

BACKGROUND

Cryogenic fluid, such as liquid hydrogen, has been used as fuel for machines, such as vehicles. Oftentimes, the cryogenic fluid is initially stored in a storage tank. The cryogenic fluid is then transferred from the storage tank to another storage tank of a machine, via specialized nozzle, receptacle, and/or hose(s), where it is subsequently used as fuel for a machine.

In some instances, a nozzle is connected to a hose that extends from and is fluidly connected to a storage tank of a filling station for cryogenic fluid, such as liquid hydrogen. A corresponding receptacle is connected to a fill tank of a vehicle that will subsequently transport the liquid hydrogen to another location. To complete a filling sequence, an operator connects the nozzle to the receptacle to enable the liquid hydrogen to flow from the storage tank of the filling station and into the fill tank of the vehicle. After the filling sequence is complete, the operator is to disconnect the nozzle from the receptacle. Occasionally, an operator may forget to disconnect the nozzle from the receptacle after filling the fill tank and drive the vehicle away from the filling station while the nozzle remains secured to the receptacle. In such instances, the hose may be pulled off of the storage tank as the vehicle pulls away from the filling station, thereby potentially resulting in spillage of cryogenic fluid from the storage tank and/or damage to the filling station.

SUMMARY

An example breakaway valve is for use with a first jacketed hose connected to a cryogenic tank and a second jacketed hose connected to a nozzle for dispensing cryogenic fluid. The breakaway valve comprises a tank-side valve configured to be connected to the first jacketed hose. The tank-side valve comprises a tank-side valve body, a first outer jacket, and a first jacket support. The tank-side valve body defines tank-side pin holes. The first outer jacket, the first jacket support, and the first jacketed hose are configured to form a first vacuum-insulation layer when the tank-side valve is connected to the first jacketed hose. The breakaway valve also comprises a nozzle-side valve configured to be connected to the second jacketed hose. The nozzle-side valve comprises a nozzle-side valve body, a second outer jacket, and a second jacket support. The nozzle-side valve body defines nozzle-side pin holes. The second outer jacket, the second jacket support, and the second jacketed hose are configured to form a second vacuum-insulation layer when the tank-side valve is connected to the second jacketed hose. The breakaway valve also comprises a plurality of pins configured to extend through the tank-side pin holes and the nozzle-side pin holes to securely couple the tank-side valve and the nozzle-side valve together. When the tank-side valve and the nozzle-side valve are securely coupled together, the tank-side valve and the nozzle-side valve are in respective open positions to permit the cryogenic fluid to flow from the cryogenic tank and to the nozzle during a filling event. When the tank-side valve and the nozzle-side valve are decoupled from each other in a breakaway event, the tank-side valve and the nozzle-side valve are in respective closed positions to prevent the cryogenic fluid from being emitted from the first jacketed hose and the second jacketed hose.

In some examples, each of the pins is configured to simultaneously extend through one of the nozzle-side pin holes and one of the tank-side pin holes to securely couple the tank-side valve and the nozzle-side valve together. Each of the nozzle-side pin holes is configured to align with a respective one of the tank-side pin holes to receive a respective one of the pins.

In some examples, the tank-side pin holes are equidistantly spaced apart from each other circumferentially along the tank-side valve body and the nozzle-side pin holes are equidistantly spaced apart from each other circumferentially along the nozzle-side valve body.

In some examples, the pins are configured to break apart when at least a threshold force associated with the breakaway event is applied to enable the second jacketed hose to disconnect from the first jacketed hose in a manner that limits an amount of the cryogenic fluid that is discharged during the breakaway event. The threshold force at which the pins are configured to break apart is based on a composition, a quantity, a size, and a shape of the pins.

Some examples further comprise a sleeve configured to be slidably positioned over the pins to retain the pins within the tank-side pin holes and the nozzle-side pin holes. In some examples, each of the tank-side valve body and the nozzle-side valve body is composed of a metallic material. The sleeve is composed of a plastic material to facilitate the sleeve in sealingly engaging the tank-side valve body and the nozzle-side valve body.

In some examples, the tank-side valve body includes a tank-side rim and the nozzle-side valve body includes a nozzle-side rim. The tank-side rim is configured to engage the nozzle-side rim when the tank-side valve is coupled to the nozzle-side valve. At least one of the tank-side rim and the nozzle-side rim includes ribs that engage the other of the tank-side rim and the nozzle-side rim to form a sealed connection between the tank-side valve and the nozzle-side valve.

In some examples, each of the tank-side valve and the nozzle-side valve includes a valve seat, a poppet configured to sealing engage the valve seat in the closed position and be disengaged from the valve seat in the open position, and a spring to bias the poppet toward the valve seat. In some such examples, the poppet of the nozzle-side valve includes a pressure relief valve that is configured to release pressure built up from cryogenic fluid trapped within the second jacketed hose between uses. Further, in some such examples, the poppet of the nozzle-side valve defines a chamber. The pressure relief valve includes a plug, a seat, and a second spring disposed within the chamber.

In some examples, the first outer jacket and the second outer jacket are configured to couple together when the tank-side valve and the nozzle-side valve are securely coupled together such that the first outer jacket, the first jacket support, the second outer jacket, and the second jacket support are configured to form a third vacuum-insulation layer between the first vacuum-insulation layer and the second vacuum-insulation layer. Some such examples further comprise seals configured to form a sealed connection between the first outer jacket of the tank-side valve and the second outer jacket of the nozzle-side valve to facilitate maintaining a vacuum of the third vacuum-insulated layer. Some such examples further comprise a vacuum valve coupled to the first outer jacket or the second outer jacket. The vacuum valve is configured to form a vacuum in the third vacuum-insulation layer when the nozzle-side valve is coupled to the tank-side valve.

In some examples, each of the first jacket support and the second jacket support includes bellows configured to reduce heat transfer with the first vacuum-insulation layer and one or more bellow supports that include teeth configured to be inserted between and engage the bellows to provide structural support to the bellows.

In some examples, the first jacket support is sealingly and securely coupled to the first outer jacket and the tank-side valve body to maintain a vacuum of the first vacuum-insulation layer, and the second jacket support is sealingly and securely coupled to the second outer jacket and the tank-side valve body to maintain a vacuum of the second vacuum-insulation layer.

Another example breakaway valve is for use between a cryogenic tank and a nozzle for dispensing cryogenic fluid. The breakaway valve comprises a first valve. The first valve comprises a first valve body that includes a distal edge. The first valve body defines through-holes and notches along the distal edge. The breakaway valve comprises a second valve. The second valve comprises a second valve body that defines a first set of blind holes and a second set of blind holes. The breakaway valve comprises a plurality of shear pins configured to extend through the through-holes and into the first set of blind holes. The plurality of shear pins are configured to shear apart when at least a predetermined axial force is applied to pull the second valve away from the first valve. The breakaway valve comprises a plurality of anti-rotation pins configured to extend through the notches and into the second set of blind holes. The plurality of anti-rotation pins are configured to withstand up to at least a predetermined torsional force to deter the second valve from separating from the first valve prior to at least the predetermined axial force is applied. When the first valve and the second valve are securely coupled together, the first valve and the second valve are in respective open positions to permit the cryogenic fluid to flow from the cryogenic tank and to the nozzle during a filling event. When the first valve and the second valve are decoupled from each other in a breakaway event, the first valve and the second valve are in respective closed positions to limit emission of the cryogenic fluid.

In some examples, the notches include open ends through which the anti-rotation pins are configured to slide when at least the predetermined axial force is applied so that the anti-rotation pins do not interfere with the second valve separating from the first valve when the shear pins shear apart and the anti-rotation pins remain intact.

In some examples, the first set of blind holes and the second set of blind holes are aligned circumferentially on the second valve such that the shear pins and the anti-rotation pins are aligned when the second valve is coupled to the first valve.

In some examples, each of the anti-rotation pins has a thickness that is greater than that of each of the shear pins so that the anti-rotation pins prevent the shear pins from breaking when less than the predetermined torsional force is applied.

In some examples, the plurality of shear pins have a substantially hourglass cross-section that facilitates the shear pins in consistently shearing when the predetermined axial force is applied. In some such examples, each of the anti-rotation pins has a substantially cylindrical cross-section. In some such examples, each of the shear pins includes a radially-inner portion that is configured to be received by a respective one of the first set of blind holes, a radially-outer portion that is configured to be received by a respective one of the through-holes, and a radially-middle portion between the radially-inner portion and the radially-outer portion. Further, in some such examples, the radially-inner portion is wider than the radially-outer portion, and the radially-outer portion is wider than the radially-middle portion. Further, in some such examples, for each of the shear pins, the radially-inner portion is press fit into a respective one of the first set of blind holes. Further, some such examples further comprise a shear-pin ring for each of the shear pins. For each of the shear pins, the shear-pin ring is press fit between the radially-outer portion and the first valve body in a respective one of the through-holes.

Some examples further comprise an omni-seal and a ring that are configured to extend circumferentially between and engage the second valve body and the first valve body adjacent to the shear pins and the anti-rotation pins to form a sealed connection between the second valve and the first valve.

Some examples further comprise a sleeve configured to be slidably positioned over the shear pins and the anti-rotation pins to retain the shear pins and the anti-rotation pins in place.

In some examples, the first valve is configured to connect to a first jacketed hose, and the first valve further comprises a first outer jacket and a first jacket support. The first outer jacket and the first jacket support are configured to form a first vacuum insulation layer with the first jacketed hose when the first valve is connected to the first jacketed hose. In some such examples, the second valve is configured to connect to a second jacketed hose, and the second valve further comprises a second outer jacket and a second jacket support. The second outer jacket and the second jacket support are configured to form a second vacuum insulation layer with the second jacketed hose when the second valve is connected to the second jacketed hose.

In some examples, the first valve is a nozzle-side valve fluidly connected to the nozzle and the second valve is a tank-side valve fluidly connected to the cryogenic tank.

Another example breakaway valve is for use between a cryogenic tank and a nozzle for dispensing cryogenic fluid. The breakaway valve comprises a tank-side valve configured to be fluidly connected to the cryogenic tank. The tank-side valve comprises a tank-side valve body that includes a distal edge. The tank-side valve body defines through-holes and notches along the distal edge. The breakaway valve comprises a nozzle-side valve configured to be fluidly connected to the nozzle. The nozzle-side valve comprises a nozzle-side valve body that defines a first set of blind holes and a second set of blind holes. The breakaway valve comprises a plurality of shear pins configured to extend through the through-holes and into the first set of blind holes. The plurality of shear pins are configured to shear apart when at least a predetermined axial force is applied to pull the nozzle-side valve away from the tank-side valve. The breakaway valve comprises a plurality of anti-rotation pins configured to extend through the notches and into the second set of blind holes. The plurality of anti-rotation pins are configured to withstand up to at least a predetermined torsional force to deter the nozzle-side valve from separating from the tank-side valve prior to at least the predetermined axial force is applied. When the tank-side valve and the nozzle-side valve are securely coupled together, the tank-side valve and the nozzle-side valve are in respective open positions to permit the cryogenic fluid to flow from the cryogenic tank and to the nozzle during a filling event. When the tank-side valve and the nozzle-side valve are decoupled from each other in a breakaway event, the tank-side valve and the nozzle-side valve are in respective closed positions to prevent emission of the cryogenic fluid on a tank side and to limit emission on a nozzle side.

In some examples, the notches include open ends through which the anti-rotation pins are configured to slide when at least the predetermined axial force is applied so that the anti-rotation pins do not interfere with the nozzle-side valve separating from the tank-side valve when the shear pins shear apart and the anti-rotation pins remain intact.

In some examples, the first set of blind holes and the second set of blind holes are aligned circumferentially on the nozzle-side valve such that the shear pins and the anti-rotation pins are aligned when the nozzle-side valve is coupled to the tank-side valve.

In some examples, each of the anti-rotation pins has a thickness that is greater than that of each of the shear pins so that the anti-rotation pins prevent the shear pins from breaking when less than the predetermined torsional force is applied.

In some examples, the plurality of shear pins have a substantially hourglass cross-section that facilitates the shear pins in consistently shearing when the predetermined axial force is applied. In some such examples, each of the anti-rotation pins has a substantially cylindrical cross-section. In some such examples, each of the shear pins includes a radially-inner portion that is configured to be received by a respective one of the first set of blind holes, a radially-outer portion that is configured to be received by a respective one of the through-holes, and a radially-middle portion between the radially-inner portion and the radially-outer portion. Further, in some such examples, the radially-inner portion is wider than the radially-outer portion, and the radially-outer portion is wider than the radially-middle portion. Further, in some such examples, for each of the shear pins, the radially-inner portion is press fit into a respective one of the first set of blind holes. Further, some such examples further comprise a shear-pin ring for each of the shear pins. For each of the shear pins, the shear-pin ring is press fit between the radially-outer portion and the tank-side valve body in a respective one of the through-holes.

Some examples further comprise an omni-seal and a ring that are configured to extend circumferentially between and engage the nozzle-side valve body and the tank-side valve body adjacent to the shear pins and the anti-rotation pins to form a sealed connection between the nozzle-side valve and the tank-side valve.

Some examples further comprise a sleeve configured to be slidably positioned over the shear pins and the anti-rotation pins to retain the shear pins and the anti-rotation pins in place.

In some examples, the tank-side valve is configured to connect to a first jacketed hose that is connected to the cryogenic tank, and the tank-side valve further comprises a first outer jacket and a first jacket support. The first outer jacket and the first jacket support are configured to form a first vacuum insulation layer with the first jacketed hose when the tank-side valve is connected to the first jacketed hose. In some such examples, the nozzle-side valve is configured to connect to a second jacketed hose that is connected to the nozzle, and the nozzle-side valve further comprises a second outer jacket and a second jacket support. The second outer jacket and the second jacket support are configured to form a second vacuum insulation layer with the second jacketed hose when the nozzle-side valve is connected to the second jacketed hose. Further, in some such examples, the predetermined axial force corresponds with the breakaway event. The plurality of shear pins are configured to break apart when at least the predetermined axial force is applied to enable the second jacketed hose to disconnect from the first jacketed hose in a manner that limits an amount of the cryogenic fluid that is discharged during the breakaway event.

DETAILED DESCRIPTION OF THE DRAWINGS

Figure 1:
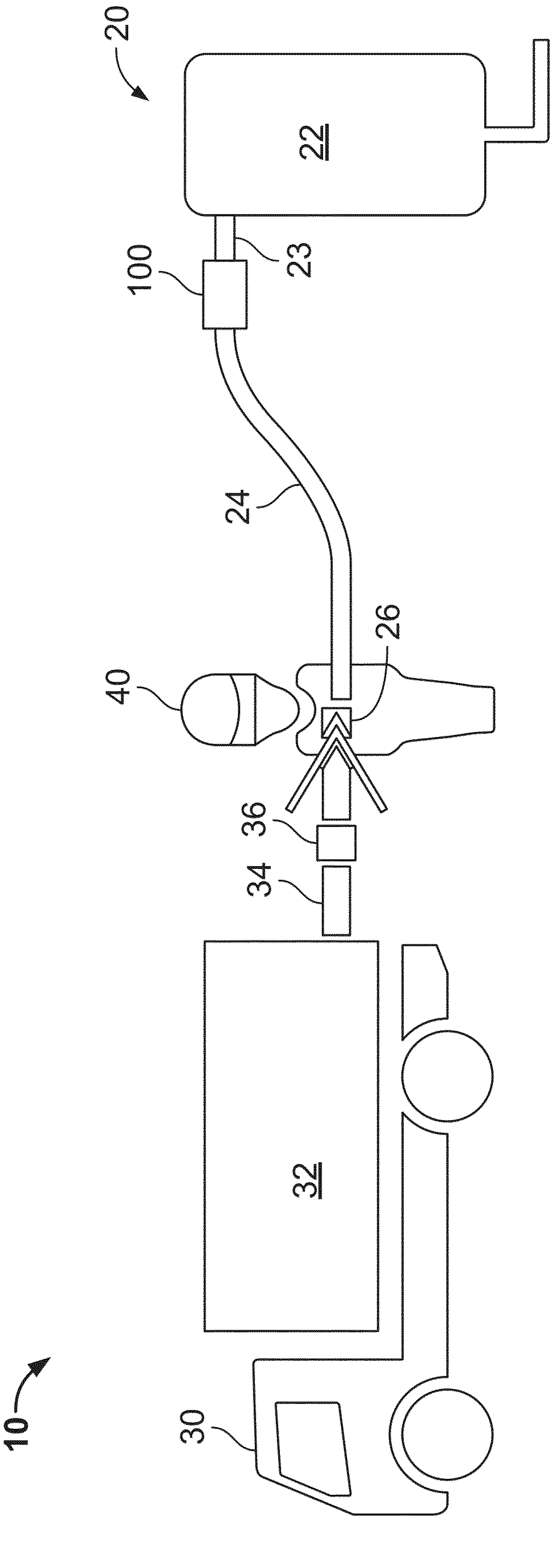
FIG. 1 illustrates an example system for filling a fill tank with cryogenic fluid in accordance with the teachings herein.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The present specification is intended to be taken as a whole and interpreted in accordance with the principles of the present invention as taught herein and understood by one of ordinary skill in the art.

The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Some features may be described using relative terms such as top, bottom, vertical, rightward, leftward, etc. It should be appreciated that such relative terms are only for reference with respect to the appended drawings. These relative terms are not meant to limit the disclosed embodiments.

Breakaway valves disclosed herein are configured to be coupled to and positioned between a storage tank and a hose of a filling station for cryogenic fluid, such as liquid hydrogen. The breakaway valve is configured to quickly seal the storage tank and an end of the hose if the hose is pulled off of the storage tank, for example, due to an operator forgetting to disconnect the nozzle from a receptacle of a fill tank after a filling event and subsequently driving a vehicle with the fill tank away from the filling station while the nozzle remains secured to the receptacle. In turn, the breakaway valve limits the amount of cryogenic fluid that is discharged from the filling station and/or limits damage to the filling station during such a breakaway event.

Breakaway valves disclosed herein are configured to securely control the flow of liquid hydrogen or other cryogenic fluid from a fill tank and through a hose. The breakaway valves include a tank-side valve connected to a tank and a nozzle-side valve connected to a hose.

In one embodiment, the tank-side valve includes a tank-side valve body that defines tank-side pin holes, and the nozzle-side valve includes a nozzle-side valve body that defines nozzle-side pin holes. Pins extend through the tank-side pin holes and the nozzle-side pin holes to securely couple the tank-side valve and the nozzle-side valve together. When the tank-side valve and the nozzle-side valve are securely coupled together, the tank-side valve and the nozzle-side valve are open to fluidly connect the hose to the tank and, thus, permit cryogenic fluid to flow from the cryogenic fluid tank and through the hose during a filling event. Further, when the tank-side valve and the nozzle-side valve are decoupled from each other (e.g., due to a breakaway event), the tank-side valve and the nozzle-side valve are closed to prevent the cryogenic fluid from escaping from the a tank side and to limit, in a controlled manner, the escape of the cryogenic fluid from a nozzle side. The pins are configured to break apart when at least a threshold force associated with the breakaway event is applied to enable the hose to disconnect from the tank in a manner that limits the amount of discharged cryogenic fluid. The threshold force at which the pins are configured to break apart is based on a composition, a quantity, a size, and a shape of the pins.

In another embodiment, the tank-side valve and/or the nozzle-side valve includes ribs at a connection point between the tank-side valve and the nozzle-side valve to form a sealed connection between the tank-side valve and the nozzle-side valve.

In another embodiment, the breakaway valve includes a sleeve that is configured to keep the pins in place and form a seal between the tank-side valve and the nozzle-side valve.

Other embodiments of the breakaway valve include a combination of the above-identified features. For example, a breakaway valve disclosed herein includes a combination of the pins, the ribs, and/or the sleeve.

Turning to the figures, FIG. 1 illustrates an example system 10 for transferring liquid hydrogen and/or other cryogenic fluids in accordance with the teachings herein. The system 10 includes a filling station 20 and a vehicle 30 for transporting the cryogenic fluid. The filling station 20 of the illustrated example includes a storage tank 22 (also referred to a “cryogenic tank” or a “liquid hydrogen tank”), a jacketed hose 24 extending from the storage tank 22, and a nozzle 26 at a distal end of the jacketed hose 24 for dispensing the cryogenic fluid. The vehicle 30 includes a fill tank 32, a hose 34 connected to and extending from the fill tank 32, and a receptacle 36. In other examples, the receptacle 36 is mounted directly to the fill tank 32 without an external intermediate hose.

The storage tank 22 of the filling station 20 is configured to store the cryogenic fluid, and the fill tank 32 of the vehicle 30 is configured to receive the cryogenic fluid from the storage tank 22 via the jacketed hose 24, the hose 34, the nozzle 26, and the receptacle 36. In order to transfer cryogenic fluid from the storage tank 22 to the fill tank 32, an operator 40 is to couple the nozzle 26 to the receptacle 36 to fluidly connect the fill tank 32 to the storage tank 22. Once the operator 40 securely couples the nozzle 26 to the receptacle 36, the operator 40 initiates the transfer of cryogenic fluid. For example, the operator 40 may initiate the fluid transfer from a remote location by pressing a button at the filling station 20 that subsequently initiates the fill sequence.

In the illustrated example, the filling station 20 also includes an example breakaway valve 100 coupled to another jacketed hose 23 that extends between and is coupled to the breakaway valve and the storage tank 22. Alternatively, the filling station 20 includes an example breakaway valve 1000 coupled to the storage tank 22 via the jacketed hose 23. The breakaway valve 100, 1000, 2000 is configured to quickly seal ends of the jacketed hose 23 and the jacketed hose 24 if the nozzle 26 is pulled away from the storage tank 22, for example, due to the operator 40 (i) forgetting to disconnect the nozzle 26 from the receptacle 36 after completing a filling event and (ii) subsequently driving the vehicle 30 away from the filling station 20 while the nozzle 26 remains secured to the receptacle 36. In turn, the breakaway valve 100, 1000, 2000 is configured to limit the amount of cryogenic fluid that may otherwise be discharged from the filling station 20 and/or limits damage to the filling station 20 during such a breakaway event.

As disclosed below in greater detail, the example breakaway valve 100 includes a nozzle-side valve 200 and a tank-side valve 300, the example breakaway valve 1000 includes a nozzle-side valve 1200 and a tank-side valve 1300, and the example breakaway valve 2000 includes a nozzle-side valve 2200 and a tank-side valve 2300. When installed within the system of FIG. 1, the breakaway valve 100, 1000, 2000 is coupled between and fluidly connected to the jacketed hose 24 and the storage tank 22, The nozzle-side valve 200, 1200, 2200 is connected to the jacketed hose 24, and the tank-side valve 300, 1300, 2300 is coupled to the storage tank 22. Additionally, the nozzle-side valve 200, 1200, 2200 and the tank-side valve 300, 1300, 2300 are coupled and fluidly connected to each other. When the nozzle-side valve 200, 1200, 2200 and the tank-side valve 300, 1300, 2300 are coupled together between the jacketed hose 24 and the storage tank 22, both the nozzle-side valve 200, 1200, 2200 and the tank-side valve 300, 1300, 2300 are in respective open positions to enable cryogenic fluid, such as liquid hydrogen, to flow from the storage tank 22 and to the jacketed hose 24 during a fill sequence. If the vehicle 30 pulls away from the filling station 20 during a fill sequence, the nozzle-side valve 200, 1200, 2200 is configured to decouple from the tank-side valve 300, 1300, 2300 with the nozzle-side valve 200, 1200, 2200 remaining coupled to the jacketed hose 24 and the tank-side valve 300, 1300, 2300 remaining coupled to the storage tank 22. When disconnecting from each other, both the tank-side valve 300, 1300, 2300 and the nozzle-side valve 200, 1200, 2200 are configured to transition to respective closed positions to (1) prevent cryogenic fluid from escaping from the jacketed hose 24 and (2) limit, as a controlled release, an amount of cryogenic fluid that escaped from the storage tank 22 as a result of the vehicle 30 pulling away from the filling station 20 during the fill sequence.

Figure 2:
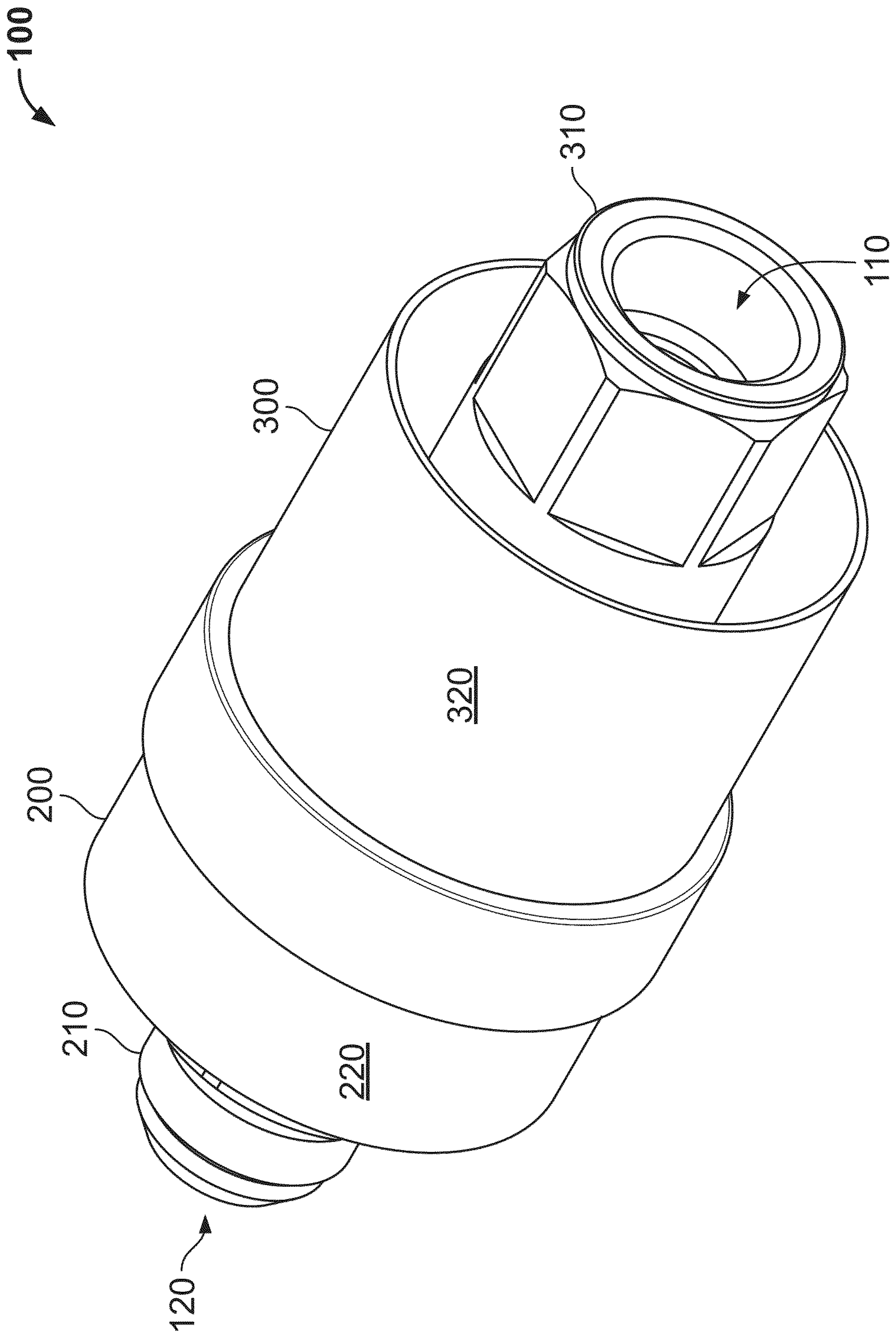
FIG. 2 is a perspective view of an example breakaway valve of the system of FIG. 1 in accordance with the teachings herein.
Figure 3:
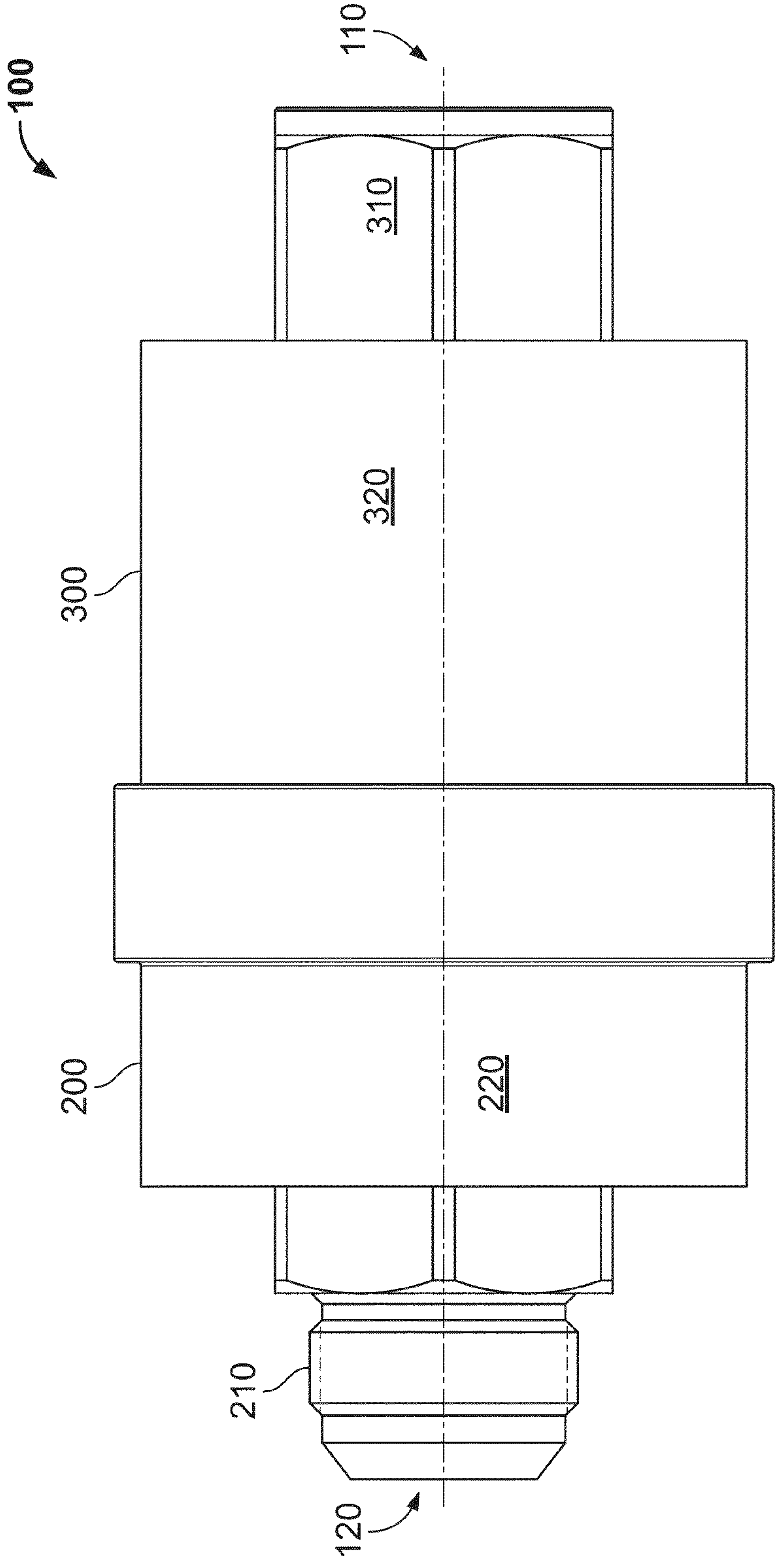
FIG. 3 is a side view of the breakaway valve of FIG. 1.
Figure 4:
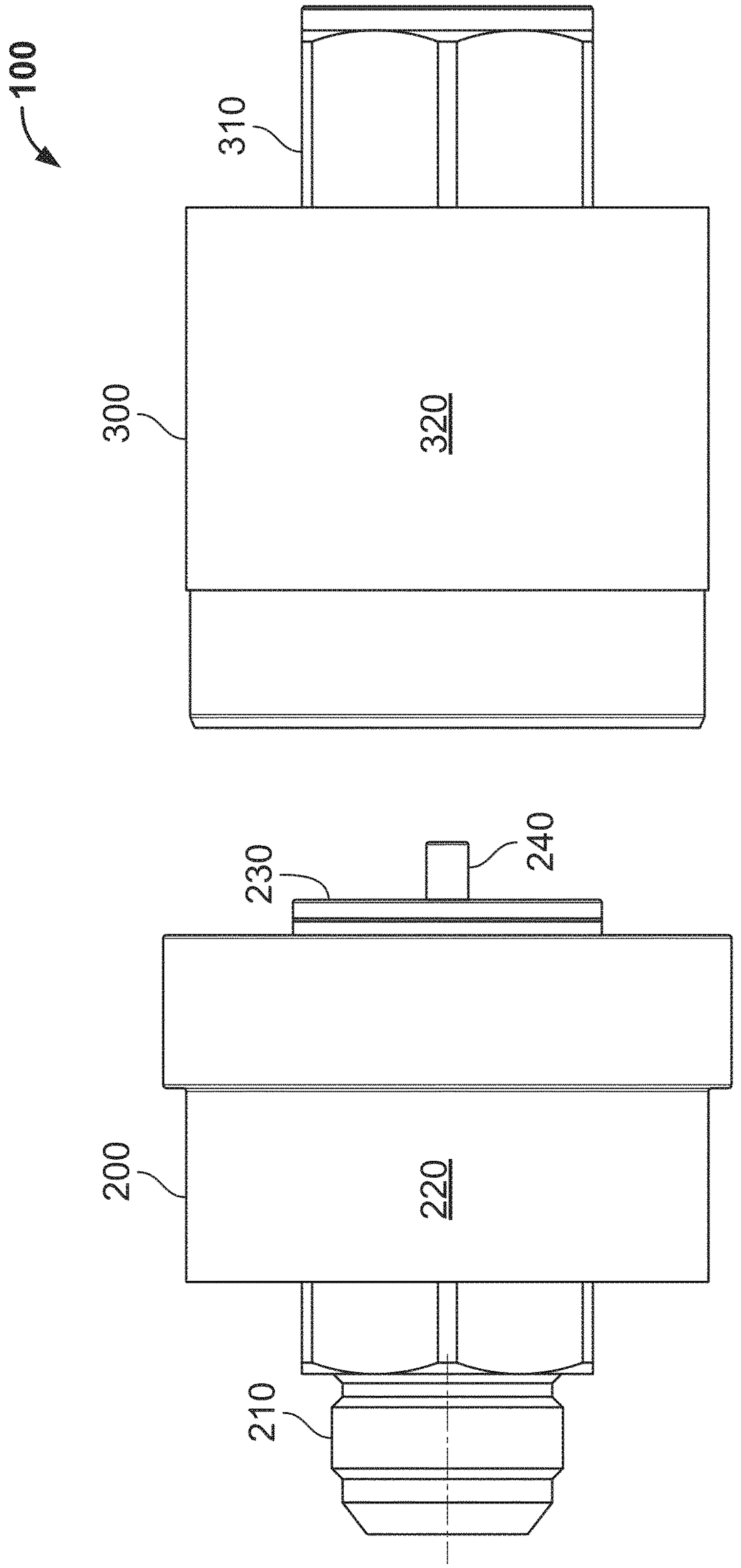
FIG. 4 is a side view of an example nozzle-side valve and an example tank-side valve of the breakaway valve of FIG. 1 in accordance with the teachings herein.
Figure 5:
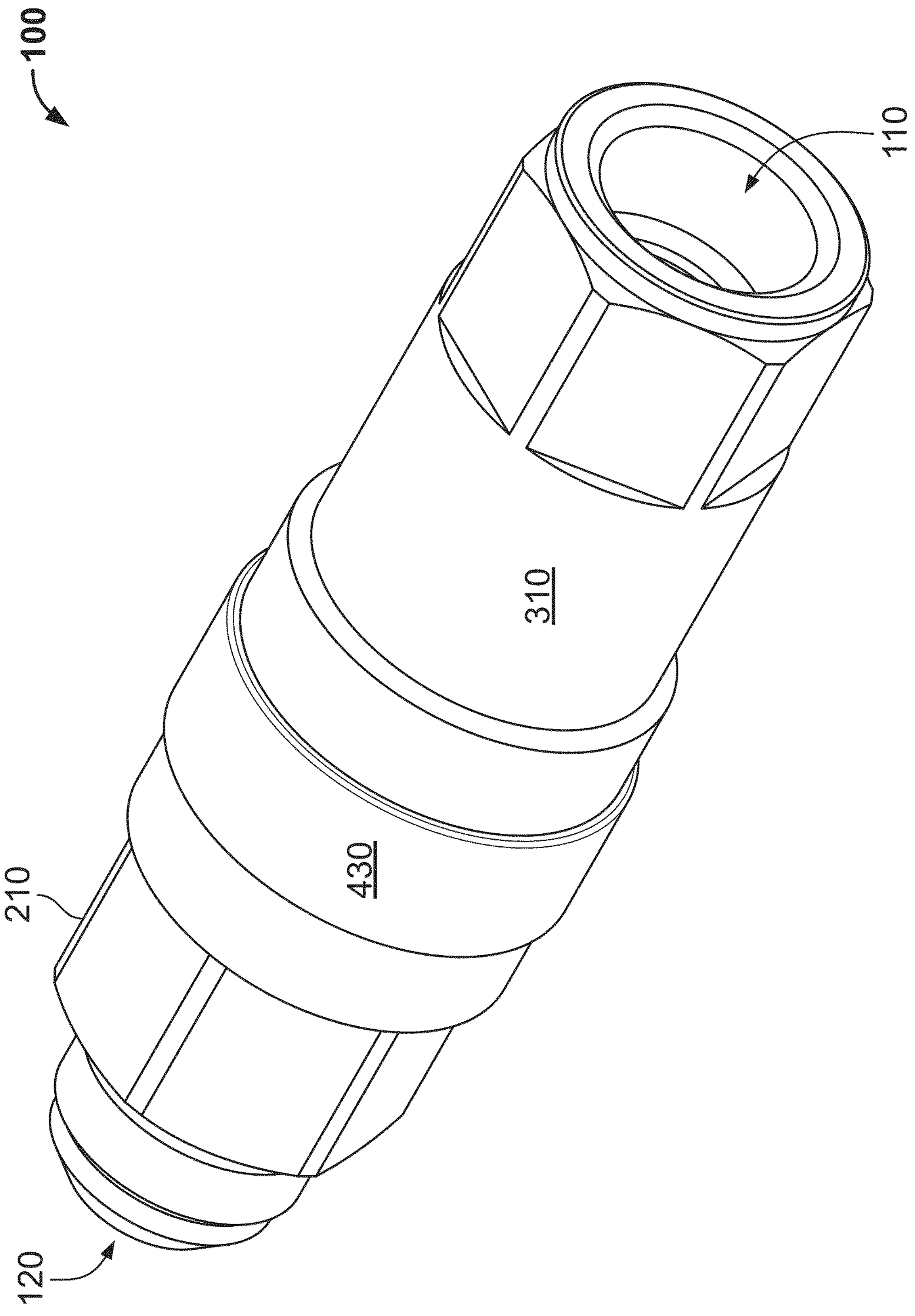
FIG. 5 is a perspective view of the breakaway valve of FIG. 1 without outer jackets.
Figure 6:
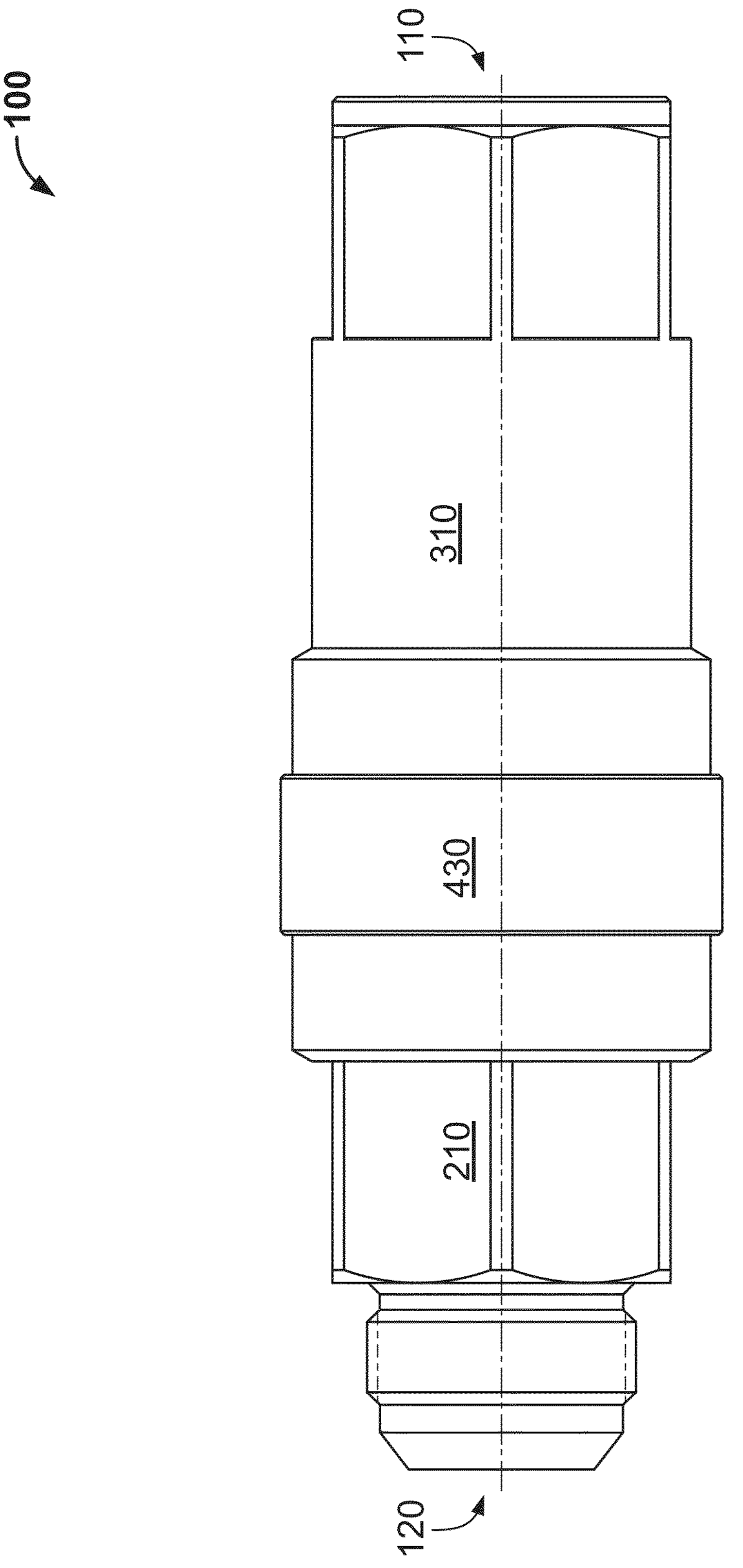
FIG. 6 is a side view of the breakaway valve of FIG. 1 without outer jackets.
Figure 7:
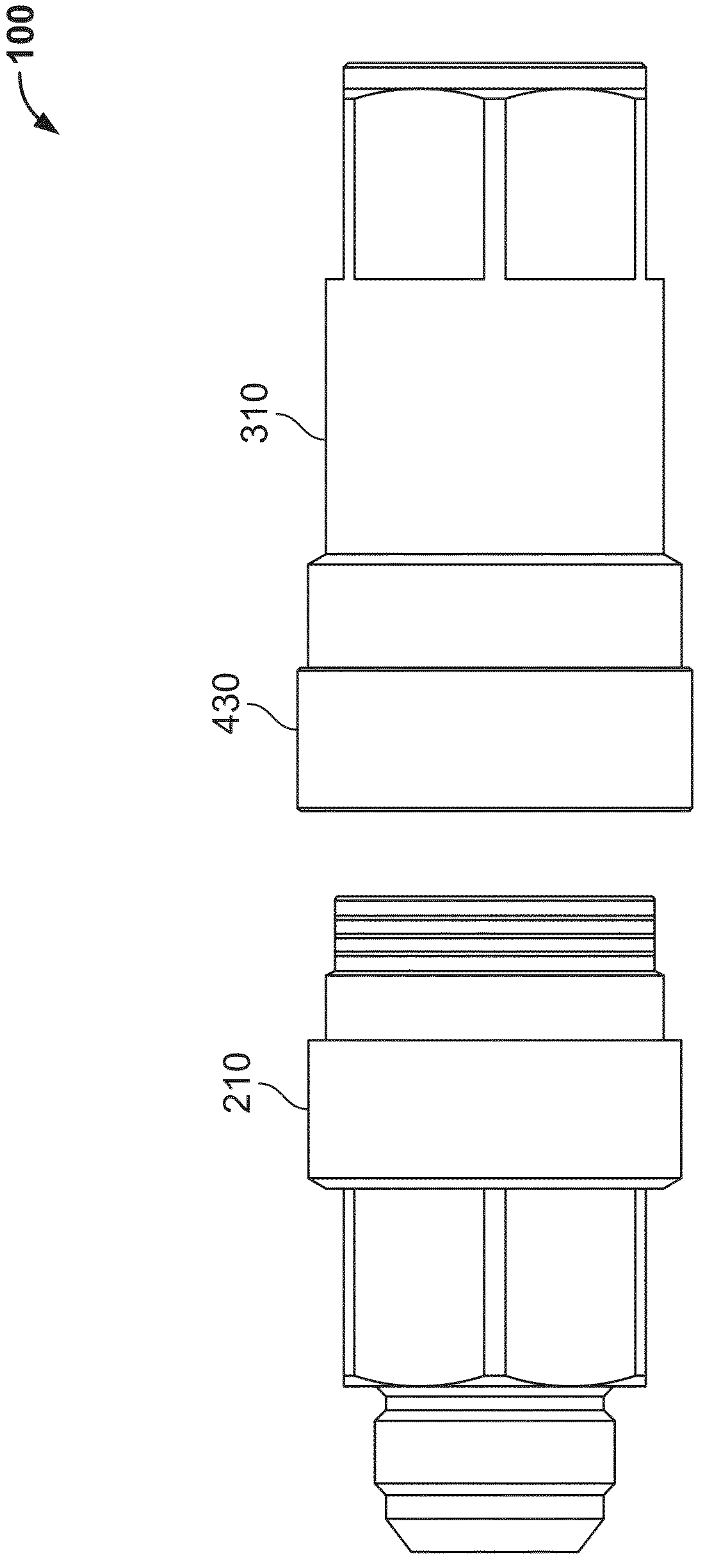
FIG. 7 is a side view of the nozzle-side valve and the tank-side valve of FIG. 4 without outer jackets.

FIGS. 2-16 illustrate the example breakaway valve 100 in accordance with the teachings herein. FIGS. 2-3 depict the breakaway valve 100 when the nozzle-side valve 200 and the tank-side valve 300 are coupled together, and FIG. 4 depicts the breakaway valve 100 when the nozzle-side valve 200 and the tank-side valve 300 are decoupled from each other. FIGS. 5-7 depict the breakaway valve 100 with outer jackets 220, 320 of the nozzle-side valve 200 and the tank-side valve 300, respectively, removed for illustration purposes. FIGS. 5-6 depict the breakaway valve 100 when the nozzle-side valve 200 and the tank-side valve 300 are coupled together, and FIG. 7 depicts the breakaway valve 100 when the nozzle-side valve 200 and the tank-side valve 300 are decoupled from each other.

Figure 8:
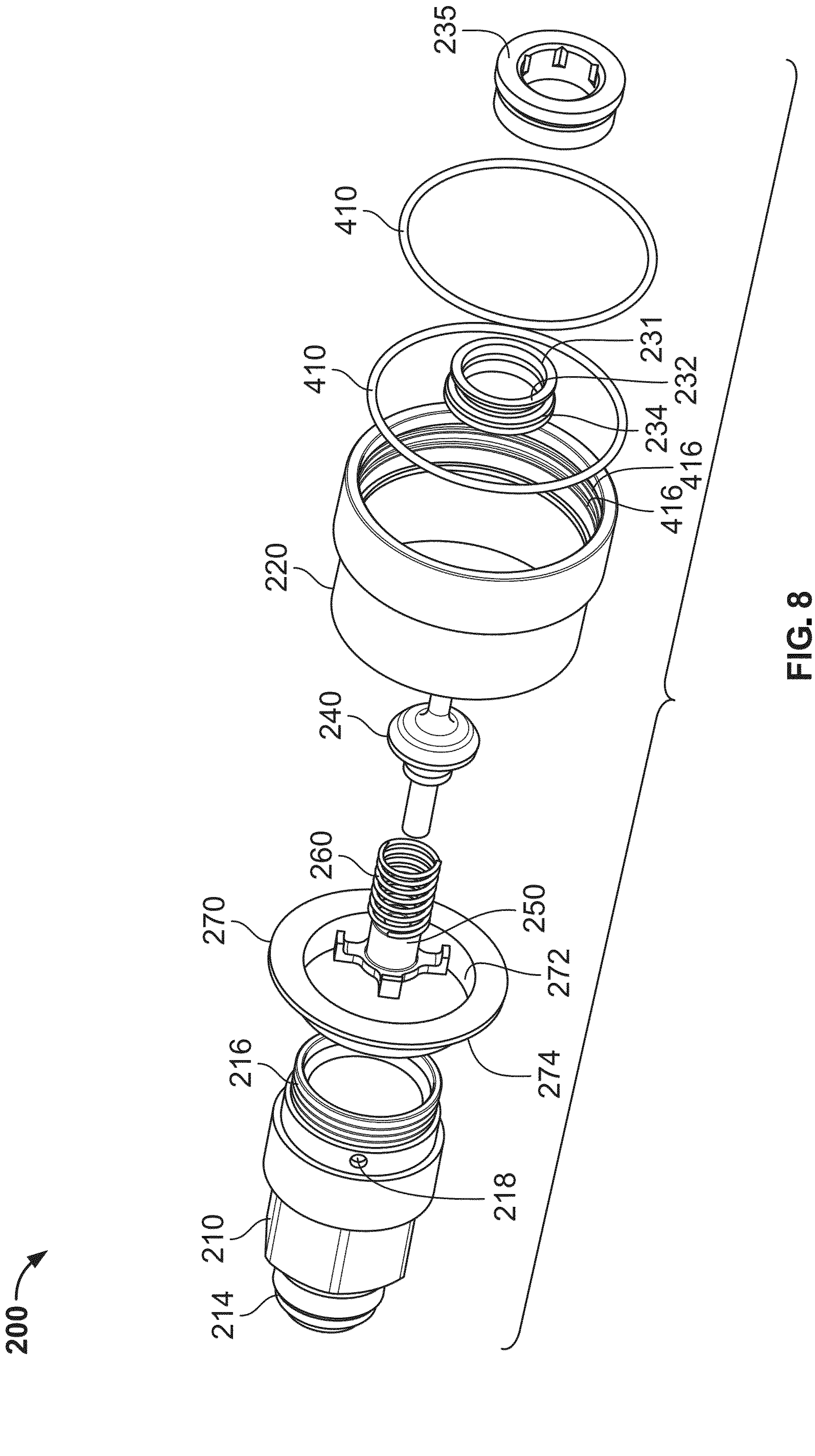
FIG. 8 is an exploded perspective view of the nozzle-side valve of FIG. 4.
Figure 9:
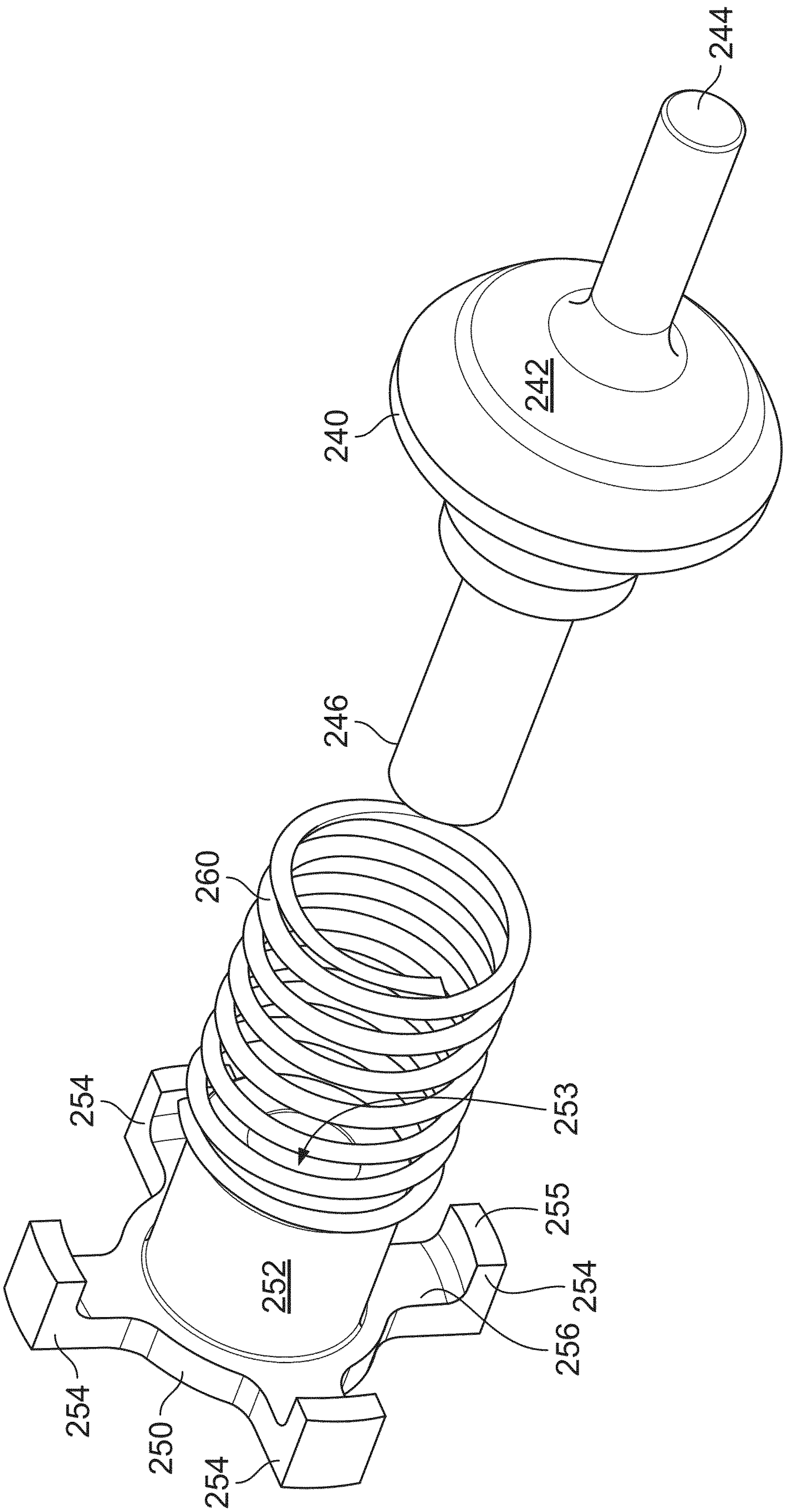
FIG. 9 is an exploded perspective view of a poppet assembly of the breakaway valve of FIG. 1.
Figure 10:
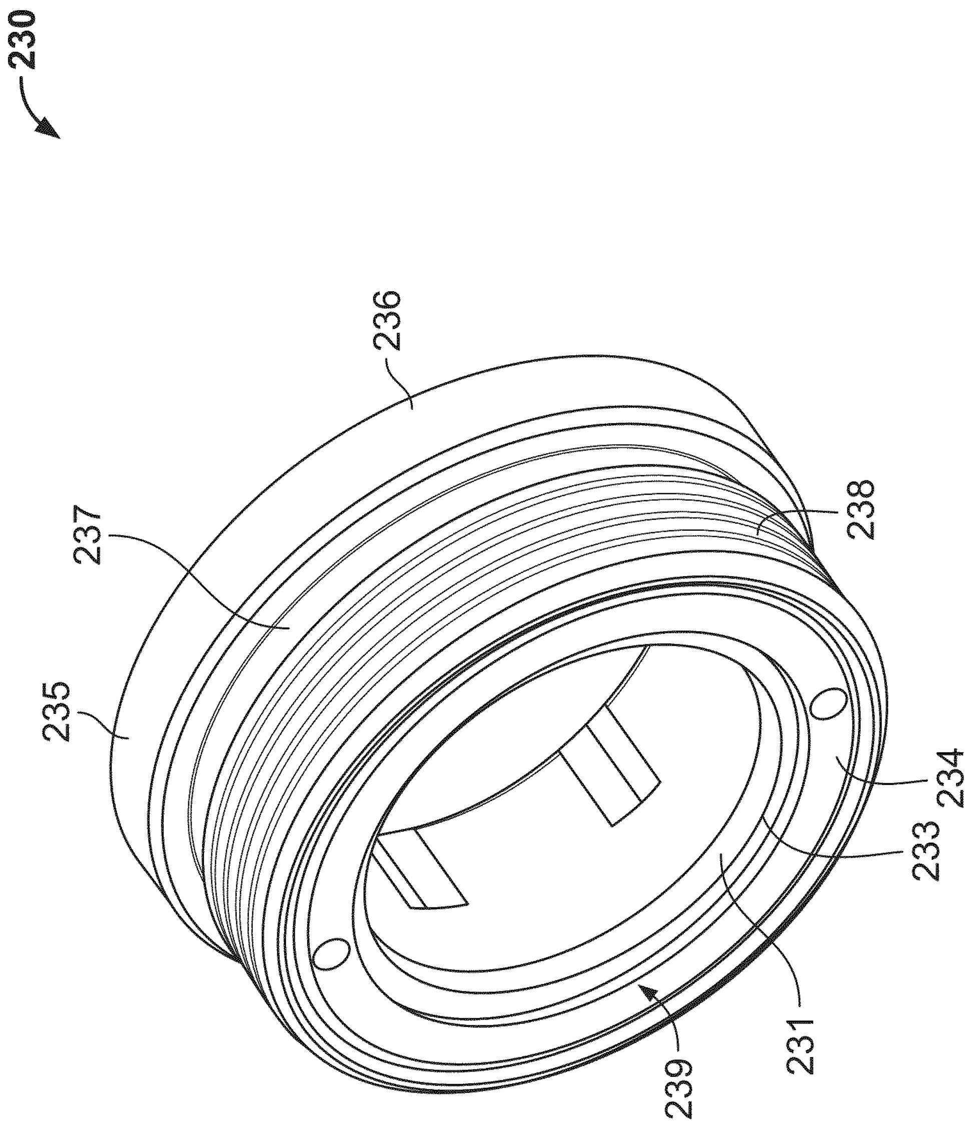
FIG. 10 is a perspective view of a valve seat assembly of the breakaway valve of FIG. 1.
Figure 11:
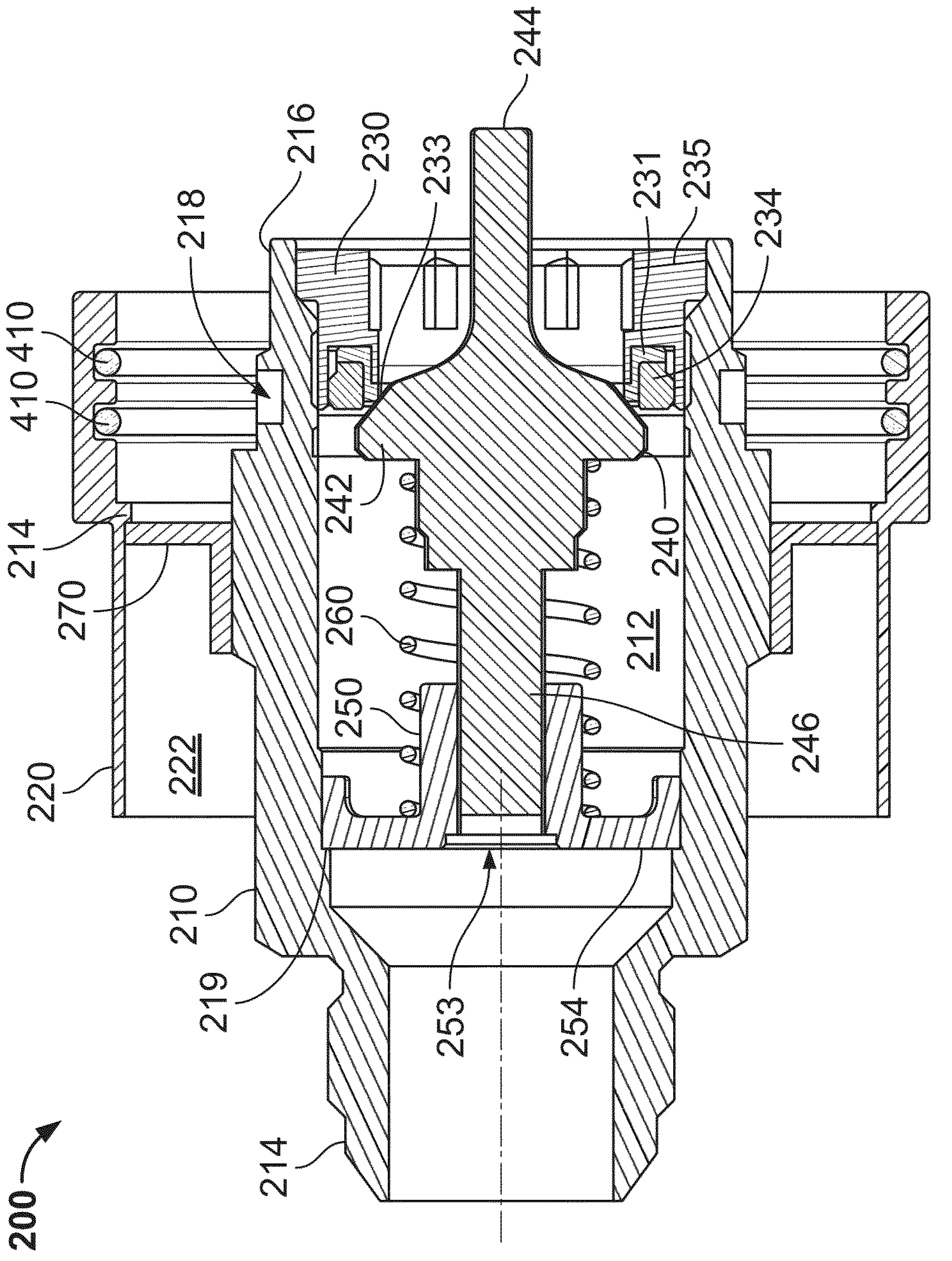
FIG. 11 is a side cross-sectional view of the nozzle-side valve of FIG. 4.

FIGS. 8-11 depict the example nozzle-side valve 200 disclosed herein. As shown in FIGS. 8 and 11, the nozzle-side valve 200 includes a valve body 210, the outer jacket 220, a valve seat 230, a poppet 240, a poppet support 250, a spring 260, and a jacket support 270.

Figure 15:
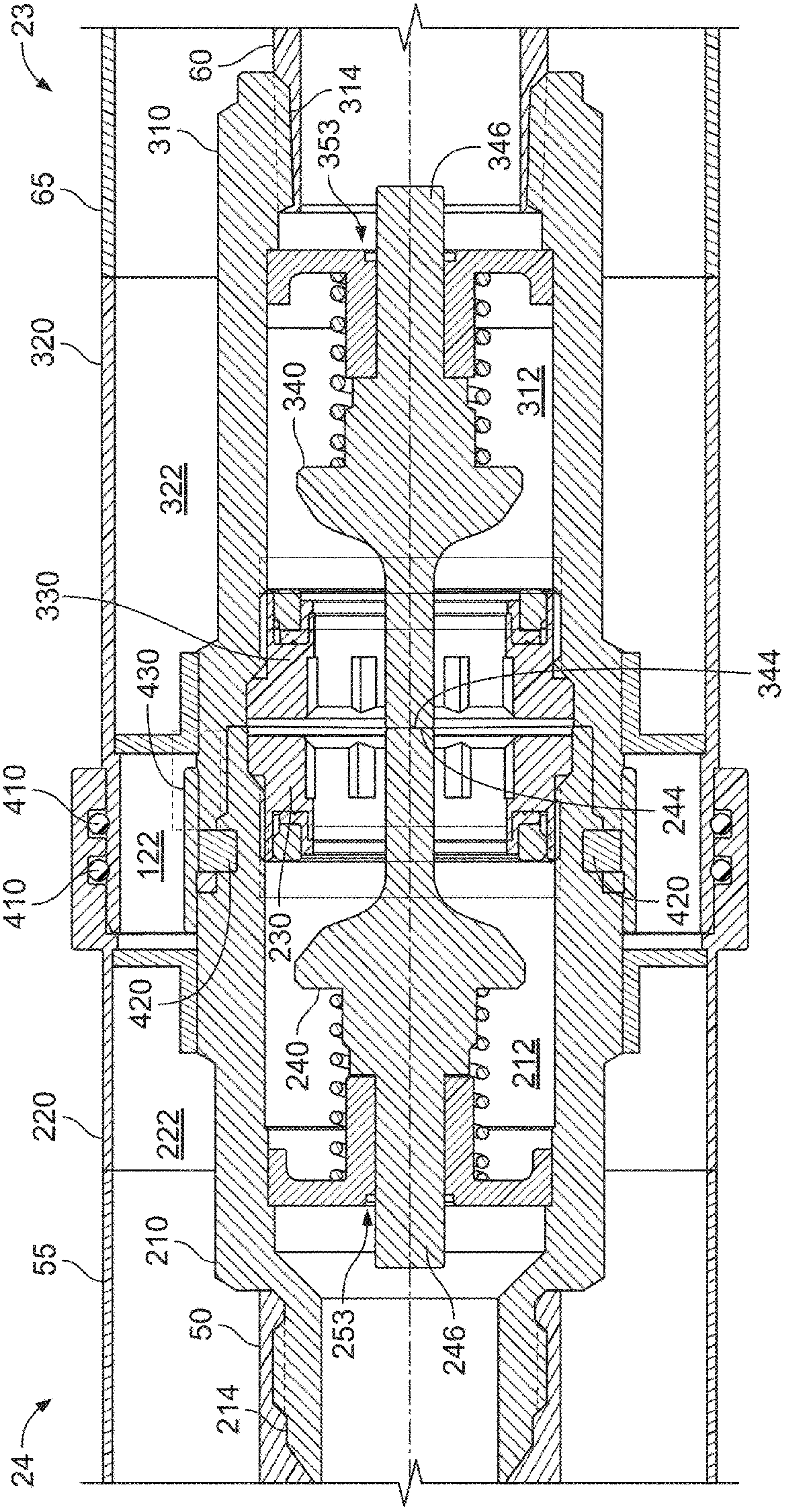
FIG. 15 a side cross-sectional view of the nozzle-side valve and the tank-side valve of FIG. 4 when coupled together.

The valve body 210 (also referred to as a "nozzle-side valve body") is composed of a metallic material that is capable of withstanding the extremely cold temperatures (e.g., −253° C.) of cryogenic fluid such as liquid hydrogen. As shown in FIGS. 8 and 11, the valve body 210 defines a chamber 212 that extends between openings opposing ends of the valve body 210. A fitting 214 (e.g., a barbed or threaded hose fitting) is located at a first end of the valve body 210. The fitting 214 is configured to securely and sealingly couple to an inner body 50 of the jacketed hose 24 of the filling station 20 (FIG. 15). For example, (1) the fitting 214 is welded to an end of the jacketed hose 24 and (2) the connection and the inner body 50 are wrapped with insulating material to seal and insulate the connection between the jacketed hose 24 and the valve body 210. As shown in FIGS. 2-3 and 5-6, the opening at the first end of the valve body 210 defines an outlet 120 of the breakaway valve 100.

Returning to FIGS. 8 and 11, the valve body 210 includes a rim 216 (also referred to as an "inner rim" or a "nozzle-side rim") at a second end of the valve body 210. As disclosed below in greater detail, the rim 216 is configured to sealingly engage a rim of the tank-side valve 300 (e.g., a rim 316 of FIG. 13) when the nozzle-side valve 200 is coupled to the tank-side valve 300. An outer surface of the valve body 210 defines a plurality of blind holes 218 (also referred to as "pin holes") adjacent the rim 216. In the illustrated example, the blind holes 218 are equidistantly spaced apart from each other circumferentially about the valve body 210 and do not extend entirely through valve body 210. As disclosed below in greater detail, the blind holes 218 are configured to align with respective holes of the tank-side valve (through-holes 318 of FIG. 13) and receive pins (e.g., pins 420 of FIG. 12) to securely couple the nozzle-side valve 200 to the tank-side valve 300.

FIG. 9 depicts a poppet assembly of the nozzle-side valve 200 that includes, among other things, poppet 240, poppet support 250, and spring 260. The components of the poppet assembly are composed of metallic and/or other material(s) capable of withstanding the extremely cold temperatures of cryogenic fluid.

The poppet support 250 includes a body 252 and a plurality of arms 254 extending radially outward from the body 252. In the illustrated example, the body 252 and the arms 254 are integrally formed together. The body 252 defines a through-hole 253 that extends along a longitudinal axis of the poppet support 250. As shown in FIG. 11, the through-hole 253 also is configured to extend along a longitudinal axis of the nozzle-side valve 200 when the poppet assembly is positioned within the chamber 212 of the valve body 210. Returning to FIG. 9, the arms 254 extend radially outward from an end of the body 252. Each of the arms 254 includes a distal flanged end 255. A proximal end of each of the arms 254 defines a spring surface 256 that is configured to securely engage a first end of the spring 260.

The poppet 240 includes a poppet body 242, a stem 244, and a shaft 246. In the illustrated example, the poppet body 242, the stem 244, and the shaft 246 are integrally formed together. The shaft 246 extends from a backside of the poppet body 242 along a longitudinal axis of the poppet 240. The shaft 246 is configured to be slidably received by the through-hole 253 of the poppet support 250. A frontside of the poppet body 242 defines a sealing surface that is configured to sealingly engage the valve seat 230 in a closed position. The stem 244 extends from the frontside of the poppet body 242 along the longitudinal axis of the poppet 240. As disclosed below in greater detail, the stem 244 is configured to engage a respective stem of the tank-side valve 300 (e.g., a stem 344 of FIG. 13) when the nozzle-side valve 200 is coupled to the tank-side valve 300 in an open position.

FIGS. 8 and 10 further depicts the valve seat 230 that includes a seat disc 231, a seat ring 234, and a seat body 235. The seat disc 231 includes a flange 232 and defines a seat surface 233. The seat surface 233 is configured to sealingly engage the poppet 240 in the closed position. The seat ring 234 is composed of polychlorotrifluoroethylene and/or any other material that is configured to form a tight seal with the poppet 240 and withstand the extremely cold temperatures of cryogenic fluid. The seat body 235 includes an outer portion 236 and an adjacent inner portion 237 that are integrally formed together. In the illustrated example, the outer portion 236 has a greater outer diameter than that of the inner portion 237 and the outer portion 236 and the inner portion 237 have the same inner diameter. An outer surface of the inner portion 237 defines external threads 238. As shown in FIG. 11, the external threads 238 are configured to be threadably received by corresponding internal threads adjacent the second end of the valve body 210.

Inner portion 237 of the seat body 235 also defines a circumferential channel 239 that is configured to house the seat disc 231 and the seat ring 234. For example, the seat disc 231 is positioned within the circumferential channel 239. The seat ring 234 is also positioned within the circumferential channel 239 such that the seat ring 234 engages and presses against the flange 232 of the seat disc 231. The seat disc 231 is secured within the circumferential channel 239 of the seat body 235 of the valve seat 230 via fasteners.

Returning to FIG. 8, the breakaway valve 100 also includes one or more seals 410. In the illustrated example, the seals 410 are two O-ring seals. In other examples, the seals 410 may include more, less, and/or a different type of seals. As disclosed below in further detail, the seals 410 are configured to form a sealed connection between the outer jacket 220 of the nozzle-side valve 200 and the outer jacket 320 of the tank-side valve 300.

FIG. 11 depicts the nozzle-side valve 200 assembled together and in a closed position. Valve seat 230 is positioned within the chamber 212 of the adjacent second end of the valve body 210. The seat body 235 is threadably coupled to the valve body 210 adjacent the second end.

The poppet support 250 is disposed within the chamber 212. The poppet support 250 engages an internal lip 219 of the valve body 210 to limit movement of the poppet support 250 in an axial direction toward the first end of the valve body 210. The spring 260 is also disposed within the chamber 212 of the valve body 210. A first end of the spring 260 engages the spring surface 256 of the poppet support 250 such that the poppet support 250 is prevented from moving in a direction toward the second end of the valve body 210. That is, the spring 260 and the internal lip 219 of the valve body 210 combine to securely fix the position of the poppet support 250 within the chamber 212.

The poppet 240 is positioned such that the shaft 246 extends along the longitudinal axis of the nozzle-side valve 200 and at least partially through the through-hole 253 of the poppet support 250. A second end of the spring 260 engages the backside of the poppet body 242 to bias the poppet 240 against the valve seat 230 in the closed position. The seat surface 233 of the seat disc 231 sealingly engages the sealing surface of the poppet 240 in the closed position, thereby preventing fluid from flowing through the opening at the second end of the valve body 210 when the nozzle-side valve 200 is in the closed position. The stem 244 of the poppet 240 extends from the chamber 212 and beyond the second end of the valve body 210 in the closed position.

As shown in FIG. 11, the outer jacket 220 is positioned circumferentially around a portion of the valve body 210. A proximal end of the outer jacket 220 is securely coupled to the nozzle 26 and/or an outer jacket of the jacketed hose 24, for example, via welding. The jacket support 270 is positioned between and engages an outer surface of the valve body 210 and an inner surface of the outer jacket 220 to securely position the outer jacket 220 around a portion of the valve body 210. The jacket support 270 is composed of, for example, a plastic material and/or a metallic material. As shown in FIGS. 8 and 11, the jacket support 270 includes an inner surface 272 that is configured to engage the valve body 210. The jacket support 270 also includes a flange 274 that is configured to engage the outer jacket 220. The flange 274 of the jacket support 270 engages an internal lip 219 to secure the axial position of the outer jacket 220 relative to the valve body 210. The outer jacket 220 also defines circumferential slots 416 adjacent a first end of the outer jacket 220. The circumferential slots 416 are configured to securely retain the seals 410 in place.

The outer jacket 220 is spaced apart from the valve body 210 to form a portion of a vacuum-insulation layer 222 (also referred to as a "jacket-insulated layer," a "sealed vacuum insulation layer," and "a vacuum-insulation sealed layer"). As shown in FIG. 15, the outer jacket 220 of the nozzle-side valve 200 is securely and sealingly coupled to an outer jacket 55 of the jacketed hose 24 (e.g., via welding). The vacuum-insulation layer 222 is formed by the outer surface of the valve body 210, the jacket support 270, a portion of the outer jacket 220 adjacent a second end of the outer jacket 220, an inner body 50 of the jacketed hose 24, and the outer jacket 55 of the jacketed hose 24. That is, the vacuum-insulation layer 222 is formed at least partially by the valve body 210, the outer jacket 220, and the jacket support 270. The vacuum-insulation layer 222 extends along a portion of the valve body 210 and at least a portion of the jacketed hose 24. The vacuum-insulation layer 222 provides a layer of insulation around the jacketed hose 24 and the valve body 210 of the nozzle-side valve 200, for example, to facilitate the operator 40 in safely grasping the jacketed hose 24 and/or the nozzle-side valve 200. The vacuum-insulation layer 222 is formed by a vacuum valve (also referred to as an "evacuation port") positioned along the outer jacket 220 of the nozzle-side valve 200 and/or the outer jacket 55 of the jacketed hose 24. For example, the vacuum valve may be similar in structure and/or operation to the evacuation port 1380 of FIG. 23. The jacket support 270 is securely and sealingly coupled (e.g., via welding) to the valve body 210 and the outer jacket 220 to maintain the vacuum of the vacuum-insulation layer 222 after the tank-side valve 300 has decoupled from the nozzle-side valve 200 due to a breakaway event.

Figure 12:
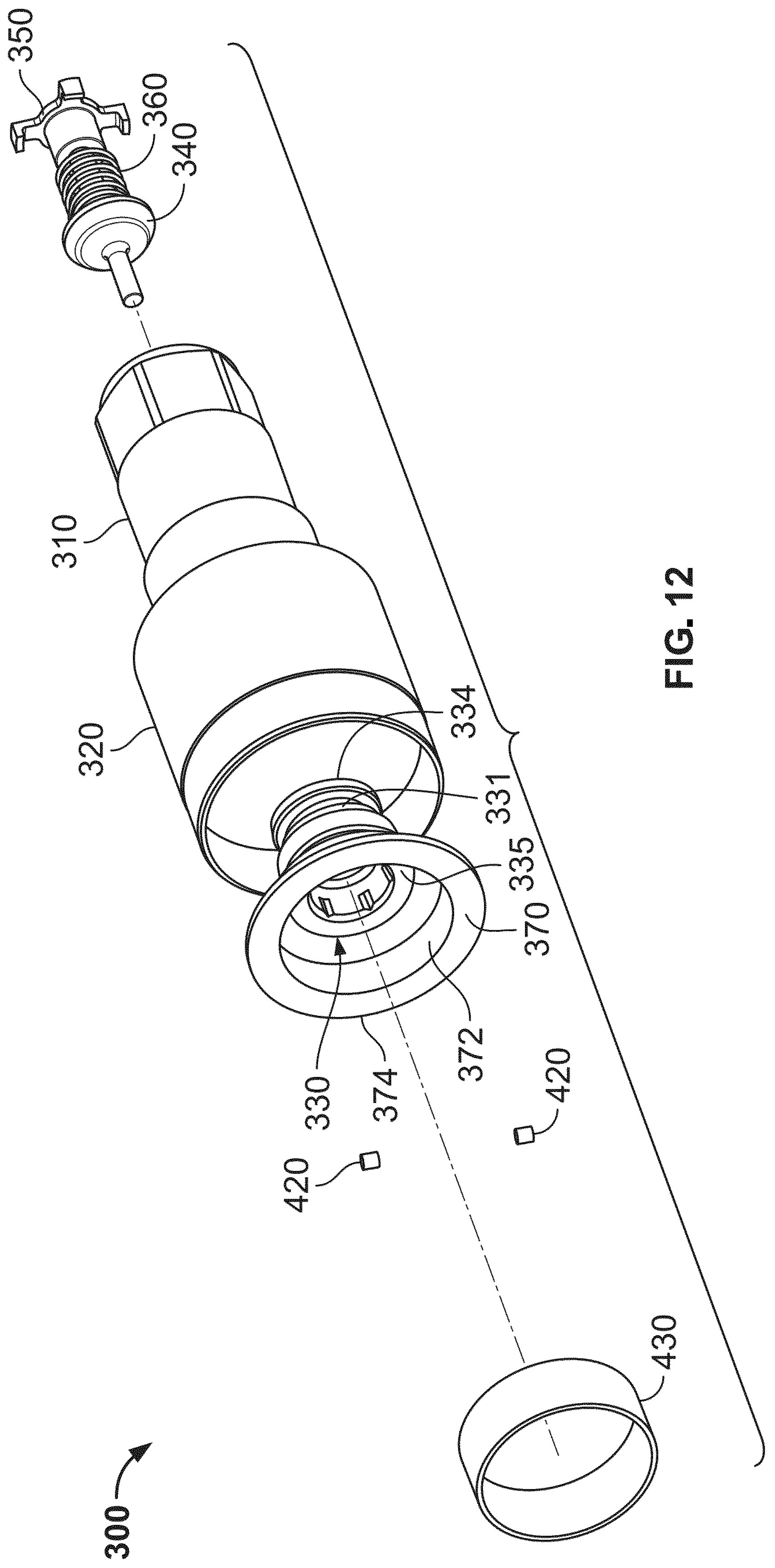
FIG. 12 is an exploded perspective view of the tank-side valve of FIG. 4.
Figure 13:
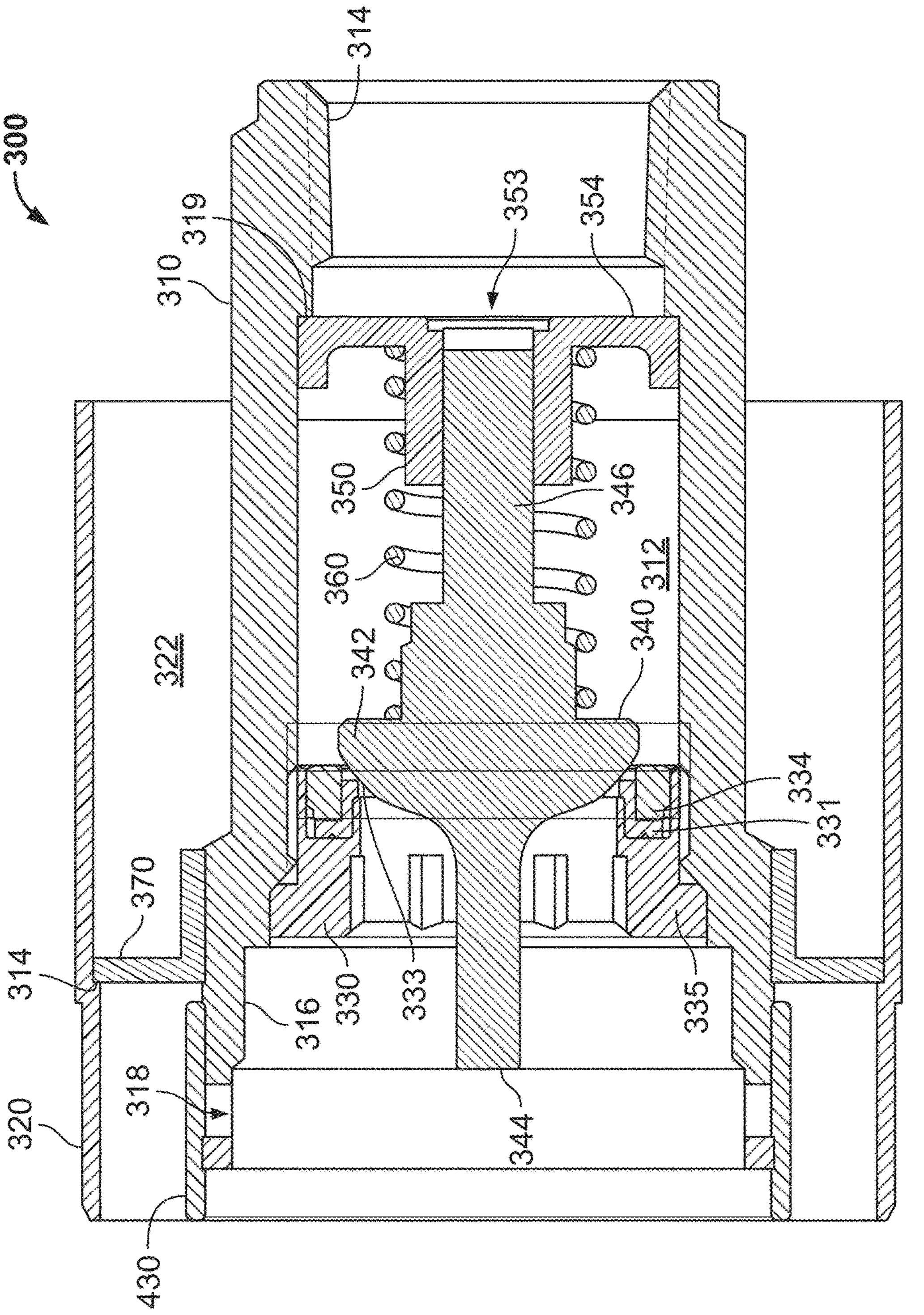
FIG. 13 is a side cross-sectional view of the tank-side valve of FIG. 4.

FIGS. 12-13 depict the example tank-side valve 300 disclosed herein. As shown in FIG. 12, the tank-side valve 300 disclosed herein includes a valve body 310, outer jacket 320, a valve seat 330, a poppet 340, a poppet support 350, a spring 360, and a jacket support 370.

The valve body 310 (also referred to as a "tank-side valve body") includes features that are identical and/or substantially similar to features of the valve body 210, unless otherwise disclosed below. Because those features have been described in detail with respect to the valve body 210 in connection with FIGS. 8-11, some of those features are not described in further detail below with respect to the valve body 310 for conciseness purposes.

As shown in FIGS. 12-13, the valve body 310 defines a chamber 312 that extends between openings opposing ends of the valve body 310. A fitting 314 (e.g., a barbed or threaded fitting) is located at a first end of the valve body 310. The fitting 314 is configured to securely and sealingly couple to an inner body 60 of the jacketed hose 23 and/or the storage tank 22 of the filling station 20, for example, via welding. For example, (1) the fitting 314 is welded to an end of the inner body 60 of the jacketed hose 23 and (2) the connection and the inner body 50 are wrapped with insulating material to seal and insulate the connection between the jacketed hose 23 and the valve body 310. As shown in FIGS. 2-3 and 5-6, the opening at the first end of the valve body 310 defines an inlet 110 of the breakaway valve 100.

Returning to FIG. 13, valve body 310 includes a rim 316 (also referred to as an "outer rim" or a "tank-side rim") at a second end of the valve body 310. As disclosed below in greater detail, the rim 316 is configured to sealingly engage the rim 216 of the nozzle-side valve 200 when the nozzle-side valve 200 is coupled to the tank-side valve 300. A portion of the rim 316 defines through-holes 318 (also referred to as "pin holes"). In the illustrated example, the through-holes 318 are equidistantly spaced apart from each other circumferentially about the valve body 310. As disclosed below in greater detail, the through-holes 318 are configured to align with the blind holes 218 of the nozzle-side valve 200 and receive pins 420 (also referred to as "shear pins") to securely couple the nozzle-side valve 200 to the tank-side valve 300.

A poppet assembly of the tank-side valve 300 includes the valve seat 330, the poppet 340, the poppet support 350, and spring 360. The components of the poppet assembly are preferably composed of metallic and/or other material(s) capable of withstanding the extremely cold temperatures of cryogenic fluid. The valve seat 330, the poppet 340, the poppet support 350, and spring 360 includes features that are identical and/or substantially similar to features of the valve seat 230, the poppet 240, the poppet support 250, and spring 260, respectively, unless otherwise disclosed below. For example, the valve seat includes a seat disc 331, a seat ring 334, and a seat body 335 that are identical and/or substantially similar to the seat disc 231, the seat ring 234, and the seat body 235, respectively, of the valve seat 230. The poppet 340 includes a poppet body 342, a stem 344, and a shaft 346 that are identical and/or substantially similar to the poppet body 242, the stem 244, and the shaft 246, respectively, of the poppet 240. The poppet support 350 includes a body and arms 354 that are identical and/or substantially similar to the body 252 and arms 254, respectively, of the poppet support 350. Because features of those components have been described in detail with respect to the valve body 210 in connection with FIGS. 8-11, some features of those components are not described in further detail below with respect to the valve body 310 for conciseness purposes.

Returning to FIG. 12, the breakaway valve 100 also includes the pins 420 and a sleeve 430. As disclosed below in greater detail, the pins 420 are configured to extend through the through-holes 318 of the valve body 310 and into the blind holes 218 of the valve body 210 to securely couple together the tank-side valve 300 and the nozzle-side valve 200. The sleeve 430 is configured to engage both the outer surface of the valve body 210 and the outer surface of the valve body 310 when the sleeve 430 is positioned in place over the pins 420. In the illustrated example, the sleeve 430 is configured to slide in place over the pins 420. Further, the sleeve 430 is composed of a plastic material, for example, to facilitate the sleeve 430 in sealingly engaging the valve body 210 and the valve body 310, which are composed of a metallic material.

FIG. 13 depicts the tank-side valve 300 assembled together and in a closed position. The valve seat 330 is positioned within the chamber 312 of the adjacent second end of the valve body 310. The seat body 335 is threadably coupled to the valve body 310 adjacent the second end.

The poppet support 350 is disposed within the chamber 312. The poppet support 350 engages an internal lip 319 of the valve body 310 to limit movement of the poppet support 350 in an axial direction toward the first end of the valve body 310. The spring 360 is also disposed within the chamber 312 of the valve body 310. A first end of the spring 360 engages the spring surface of the poppet support 350 such that the poppet support 350 is prevented from moving in a direction toward the second end of the valve body 310. That is, the spring 360 and the internal lip 319 of the valve body 310 combine to securely fix the position of the poppet support 350 within the chamber 312.

The poppet 340 is positioned such that the shaft 346 extends along the longitudinal axis of the tank-side valve 300 and at least partially through a hole 353 of the poppet support 350. A second end of the spring 360 engages the backside of the poppet body 342 to bias the poppet 340 against the valve seat 330 in the closed position. The seat surface 333 of the seat disc 331 sealingly engages the sealing surface of the poppet 340 in the closed position, thereby preventing fluid from flowing through the opening at the second end of the valve body 310 when the tank-side valve 300 is in the closed position. The stem 344 of the poppet 340 extends from the chamber 312 and beyond the second end of the valve body 310 in the closed position.

The outer jacket 320 is positioned circumferentially around a portion of the valve body 310. A proximal end of the outer jacket 320 is securely coupled to an outer jacket of the jacketed hose 23 and/or a portion of the storage tank 22, for example, via welding. The jacket support 370 is positioned between and engages an outer surface of the valve body 310 and an inner surface of the outer jacket 320 to securely position the outer jacket 320 around a portion of the valve body 310. In the illustrated example, the jacket support 370 is composed of a plastic material. The jacket support 370 includes an inner surface 372 that is configured to engage the valve body 310. The jacket support 370 also includes a flange 374 that is configured to engage the outer jacket 320. The flange 374 of the jacket support 370 engages an internal lip 319 to secure the axial position of the outer jacket 320 relative to the valve body 310.

The outer jacket 320 is spaced apart from the valve body 310 to form a vacuum-insulation layer 322 (also referred to as a "jacket-insulated layer," a "sealed vacuum insulation layer," and "a vacuum-insulation sealed layer"). As shown in FIG. 15, the outer jacket 320 of the tank-side valve 300 is securely and sealingly coupled to an outer jacket 65 of the jacketed hose 23 (e.g., via welding). The vacuum-insulation layer 322 is formed by the outer surface of the valve body 310, the jacket support 370, a portion of the outer jacket 320 adjacent a second end of the outer jacket 320, an inner body 60 of the jacketed hose 23, and the outer jacket 65 of the jacketed hose 23. That is, the vacuum-insulation layer 322 is formed at least partially by the valve body 310, the outer jacket 320, and the jacket support 370. The vacuum-insulation layer 322 extends along a portion of the valve body 310 and at least a portion of the jacketed hose 23. The vacuum-insulation layer 322 provides a layer of insulation around the jacketed hose 23 and the valve body 310 of the tank-side valve 300, for example, to facilitate the operator 40 in safely grasping the jacketed hose 23 and/or the tank-side valve 300. The vacuum-insulation layer 322 is formed by a vacuum valve (also referred to as an "evacuation port") positioned along the outer jacket 320 of the tank-side valve 300 and/or the outer jacket 65 of the jacketed hose 23. For example, the vacuum valve may be similar in structure and/or operation to the evacuation port 1380 of FIG. 23. The jacket support 370 is securely and sealingly coupled (e.g., via welding) to the valve body 310 and the outer jacket 320 to maintain the vacuum of the vacuum-insulation layer 322 after the nozzle-side valve 200 has decoupled from the tank-side valve 300 due to a breakaway event.

Figure 14:
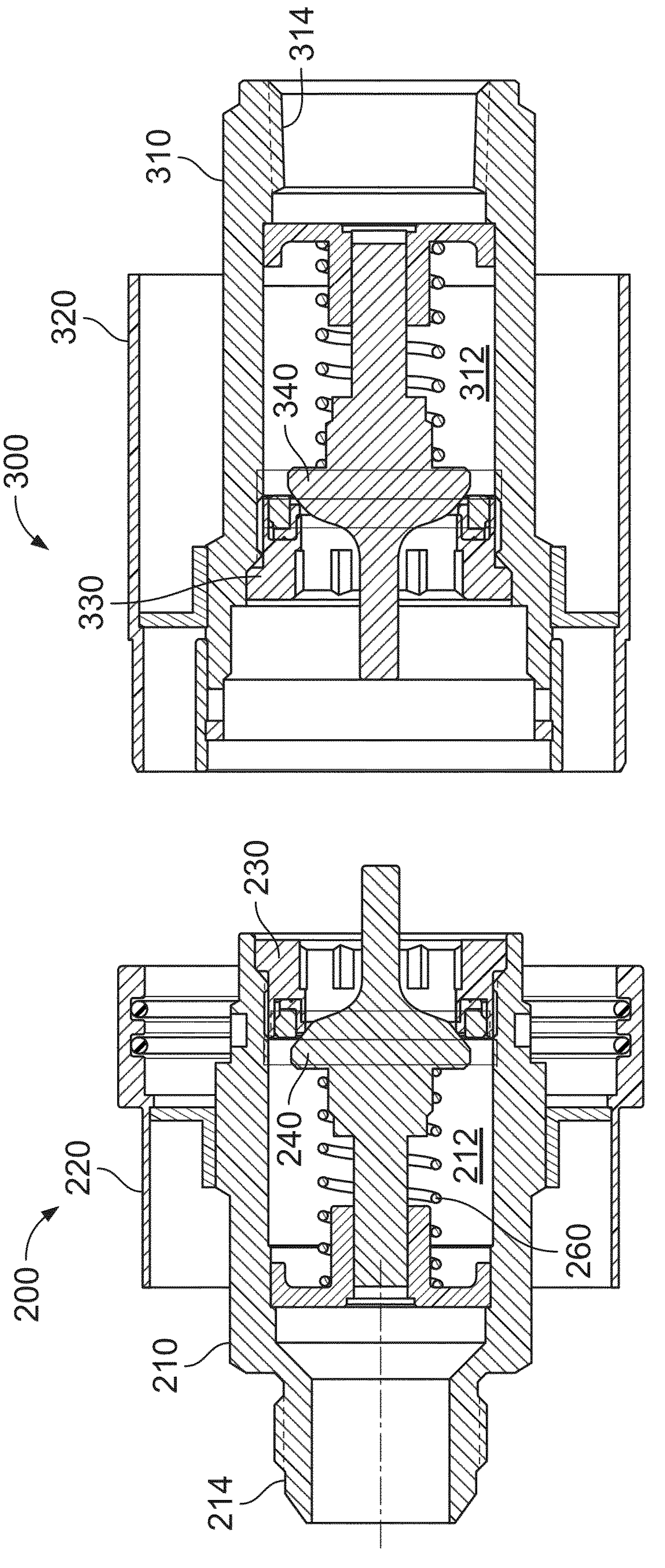
FIG. 14 a side cross-sectional view of the nozzle-side valve and the tank-side valve of FIG. 4 when decoupled from each other.

FIG. 14 further depicts the nozzle-side valve 200 and the tank-side valve 300 when decoupled from each other. When the nozzle-side valve 200 and the tank-side valve 300 are decoupled from each other, both the nozzle-side valve 200 and the tank-side valve 300 are in respective closed positions. The poppet 240 engages the valve seat 230 when the nozzle-side valve 200 is in a respective closed position to limit the amount of cryogenic fluid that is to escape out of the second end of the valve body 210 of the nozzle-side valve 200 during a breakaway event. The poppet 340 engages the valve seat 330 when the tank-side valve 300 is in a respective closed position to prevent cryogenic fluid from escaping out of the second end of the valve body 310 of the tank-side valve 300 during a breakaway event.

FIG. 15 depicts the nozzle-side valve 200 and the tank-side valve 300 when coupled together to enable a filling event at the filling station 20. For example, when the filling station 20 is in an operational state, the inner body 50 of the fitting 214 of the nozzle-side valve 200 is coupled to the jacketed hose 24, the fitting 314 of the tank-side valve 300 is coupled to the inner body 60 of the jacketed hose 23, and the nozzle-side valve 200 is securely coupled to the tank-side valve 300. When the nozzle-side valve 200 and the tank-side valve 300 are coupled together, each of the nozzle-side valve 200 and the tank-side valve 300 is in a respective open position to enable cryogenic fluid to flow from the storage tank 22, through the breakaway valve 100, and through the jacketed hose 24 to conduct a filling event. In the coupled state, the stem 244 of the nozzle-side valve 200 engages the stem 344 of the tank-side valve 300. In turn, the poppet 340 of the tank-side valve 300 applies a force to the poppet 240 that overcomes the biasing force of the spring 260 and pushes the poppet 240 to disengage from the valve seat 230. Likewise, the poppet 240 of the nozzle-side valve 200 applies a force to the poppet 340 that overcomes the biasing force of the spring 360 and pushes the poppet 340 to disengage from the valve seat 330.

Figure 16:
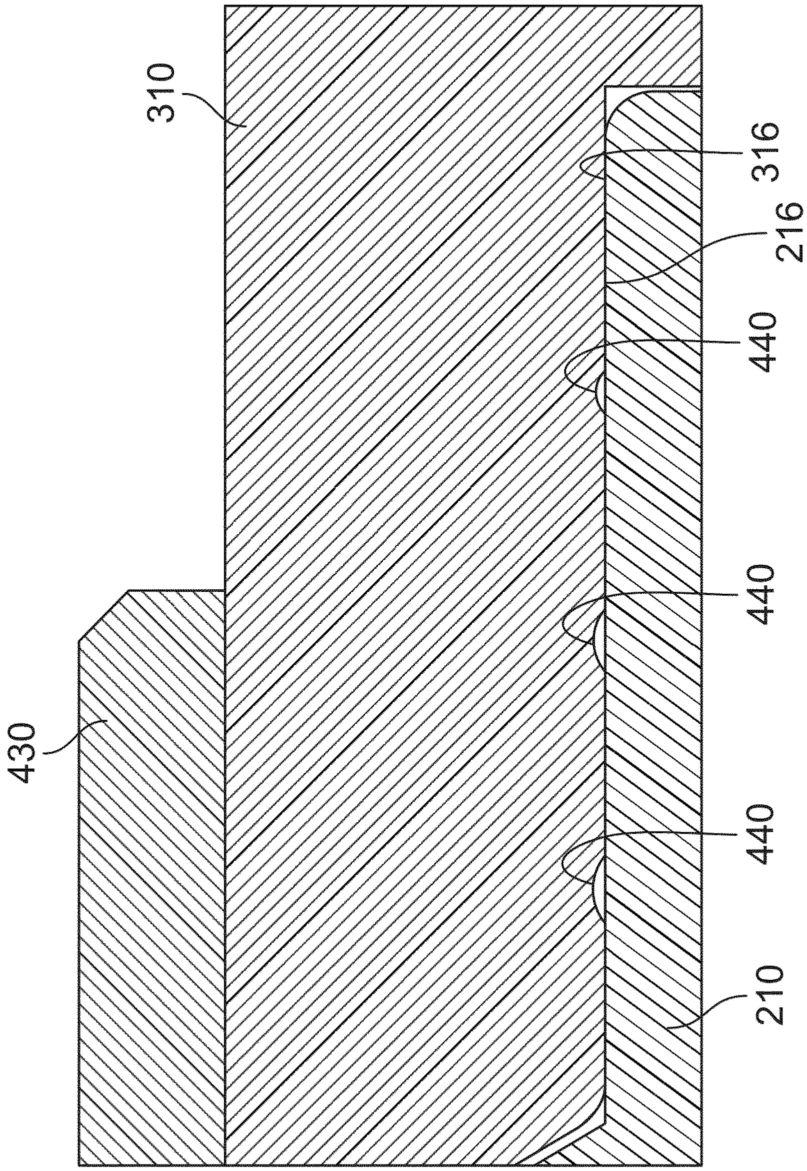
FIG. 16 is an expanded cross-section view of a portion of an example outer surface of a valve body of the nozzle-side valve of FIG. 4.

When the nozzle-side valve 200 and the tank-side valve 300 are coupled together, the rim 216 of the valve body 210 engages the rim 316 of the valve body 310 to fluidly connect the chamber 212 and the chamber 312 in a sealed manner. As shown in FIG. 16, the protruding ribs 440 are configured to form a sealed connection between the rim 216 and the rim 316, both of which are composed of a relatively hard metallic material. In the illustrated example, the rim 216 of the nozzle-side valve 200 includes the protruding ribs 440 that are configured to sealingly engage the rim 316 of the tank-side valve 300. In other examples, the rim 316 of the tank-side valve 300 includes the protruding ribs 440 that are configured to sealingly engage the rim 216 of the nozzle-side valve 200.

Returning to FIG. 15, the seals 410 sealingly engage both the outer jacket 220 and the outer jacket 320 to form an insulation layer 122 (e.g., also referred to as a "sealed insulation layer") when the nozzle-side valve 200 is coupled to the tank-side valve 300. For example, the insulation layer 122 is formed at least partially by the valve body 210, the outer jacket 220, the jacket support 270, the valve body 310, the outer jacket 320, and the jacket support 370 when the nozzle-side valve 200 and the tank-side valve 300 are coupled together. The insulation layer 122 is located axially between the vacuum-insulation layer 222 of the nozzle-side valve 200 and the vacuum-insulation layer 322 of the tank-side valve 300. In some examples, the insulation layer 122 may be a vacuum-insulation layer (also referred to as a "jacket-insulated layer," a "sealed vacuum insulation layer," and "a vacuum-insulation sealed layer") that is formed by a vacuum valve (also referred to as an "evacuation port") of the nozzle-side valve 200 and/or the tank-side valve 300. For example, the vacuum valve may be similar in structure and/or operation to the evacuation port 1380 of FIG. 23.

To securely couple the nozzle-side valve 200 and the tank-side valve 300 together, each of the pins 420 is configured to extend simultaneously through a respective one of the through-holes 318 of the tank-side valve 300 and into a respective one of the blind holes 218 of the nozzle-side valve 200. Additionally, the sleeve 430 is configured to be positioned over the pins 420 to retain the pins 420 within the blind holes 218 and the through-holes 318.

In the illustrated example, the nozzle-side valve 200 is configured to be fluidly connected to one side of the system 10, for example the nozzle 26, and the tank-side valve 300 is configured to be fluidly connected to another side of the system 10, for example the storage tank 22. The terms "nozzle-side valve" and "tank-side valve" are used for convenience and are not intended to be limiting. Additionally, in the illustrated example, the tank-side valve 300 is a first valve with a first valve body that defines the through-holes 318 for the pins 420, and the nozzle-side valve 200 is a second valve with a second valve body that defines the blind holes 218 for the pins 420. In other examples, the nozzle-side valve may be a first valve with a first valve body that defines through-holes for the pins 420, and the tank-side valve may be a second valve with a second valve body that defines blind holes for the pins 420.

The pins 420 are configured to break when a threshold force or greater is applied to the breakaway valve 100. The threshold force corresponds with a force of a breakaway event. The pins 420 are configured to break when a force associated with a breakaway event is applied to enable the jacketed hose 24 to disconnect from the jacketed hose 23 in a manner that limits the amount of cryogenic fluid that is discharged during a breakaway event. The threshold force at which the pins 420 break apart corresponds with a quantity, size, shape, and composition of the pins 420. For example, the pins 420 are composed of plastic, a ceramic, a metal, and/or any other material that enables the pins 420 to consistently break apart at a desired, relatively-low force.

In operation, the pins 420 break when at least the threshold force is applied by pulling the nozzle 26 in a direction away from the storage tank 22. When the pins 420 have broken apart, the nozzle-side valve 200, which remains connected to the jacketed hose 24, is no longer securely coupled to the tank-side valve 300, which remains connected to the jacketed hose 23. In turn, the nozzle-side valve 200 decouples from the tank-side valve 300, and the jacketed hose 24 is pulled apart from the jacketed hose 23. When the nozzle-side valve 200 decouples from the tank-side valve 300, the poppet 240 reengages the valve seat 230 to reclose the end of the nozzle-side valve 200 and the poppet 340 reengages the valve seat 330 to reclose the end of the tank-side valve 300. In the closed positions, the nozzle-side valve 200 limits the amount of cryogenic fluid that can be discharged from a respective end of the jacketed hose 24 and the tank-side valve 300 prevents cryogenic fluid from being discharged from the storage tank 22.

Figure 21:
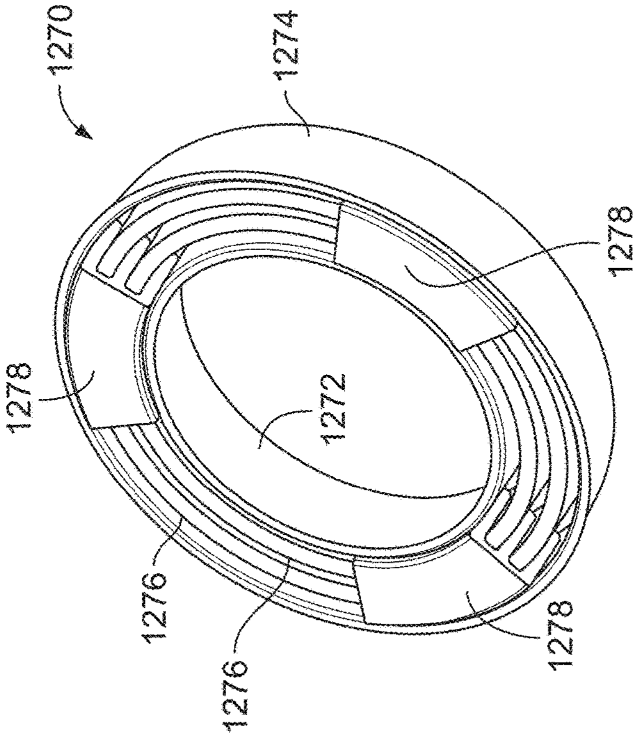
FIG. 21 depicts the jacket support of FIG. 19 with bellow supports.
Figure 22:
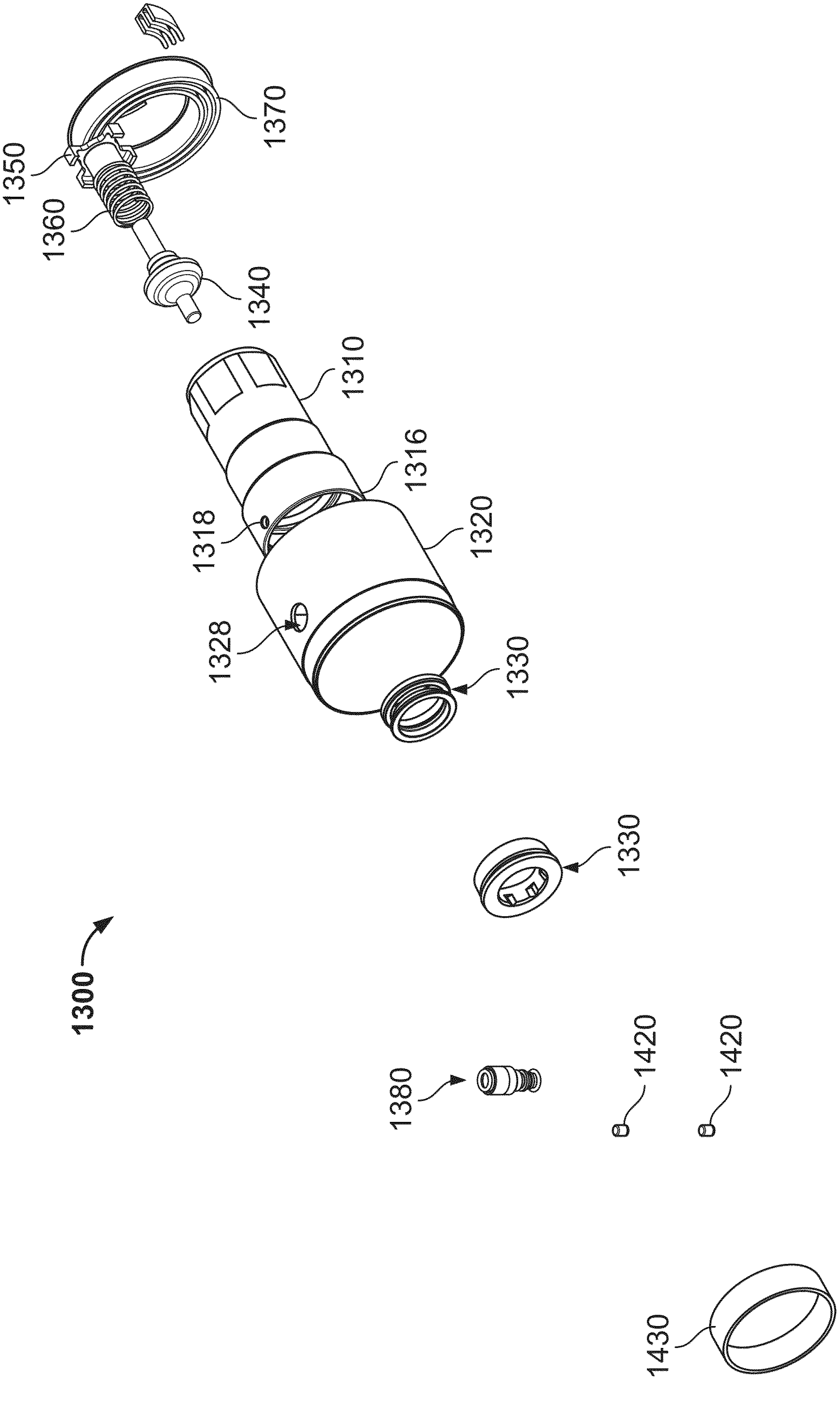
FIG. 22 is an exploded perspective view of a tank-side valve of another example breakaway valve of in accordance with the teachings herein.
Figure 23:
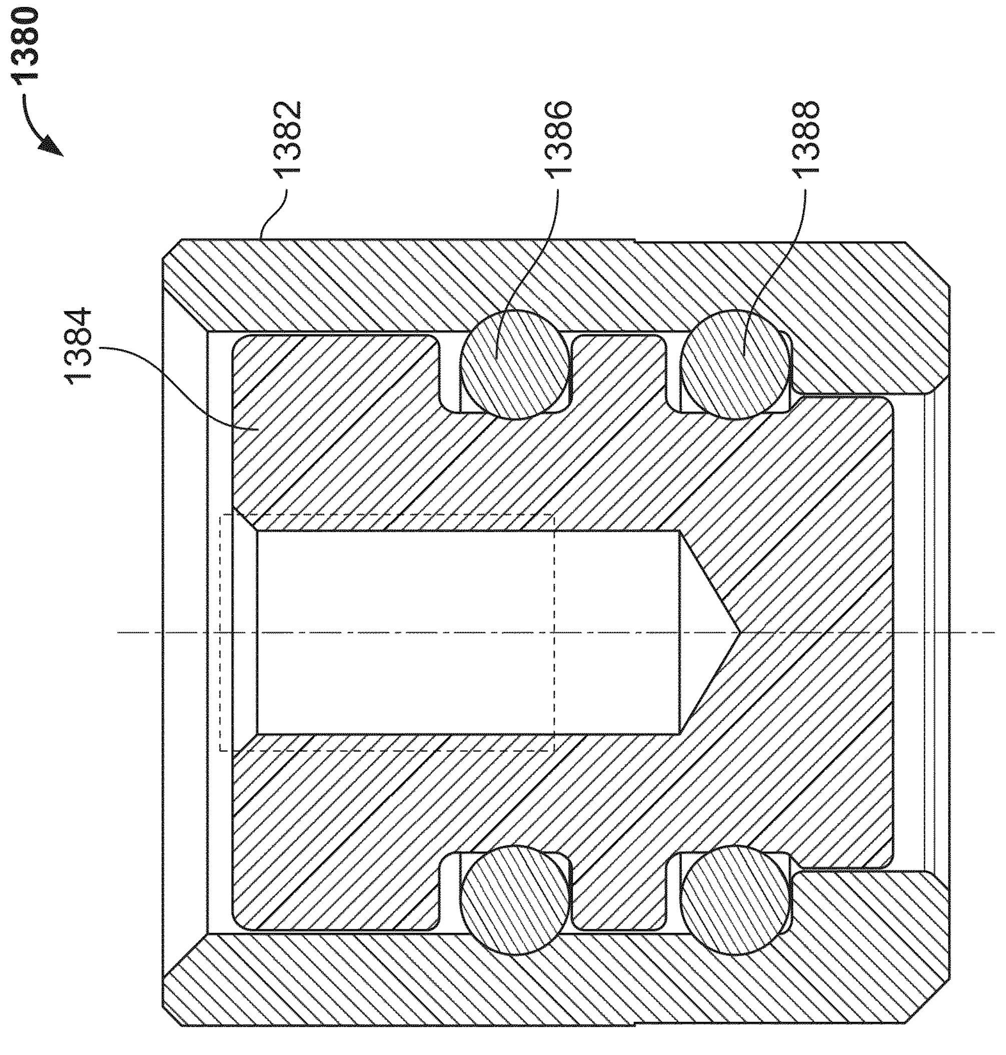
FIG. 23 is a side cross-sectional view of a vacuum valve of the tank-side valve of FIG. 22.
Figure 24:
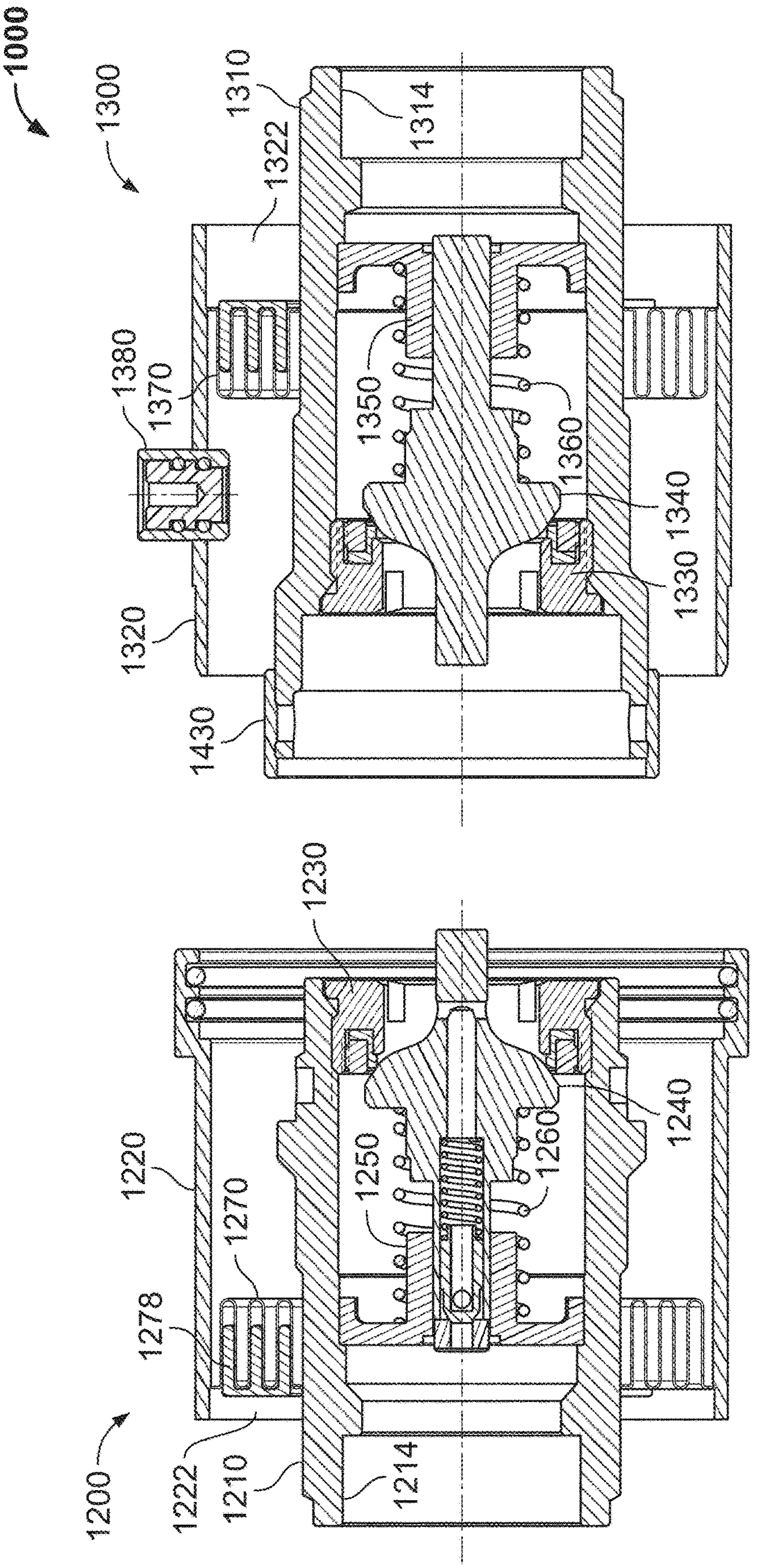
FIG. 24 depicts an example breakaway valve in accordance with the teachings herein that includes the nozzle-side valve of FIG. 17 and the tank-side valve of FIG. 22.
Figure 25:
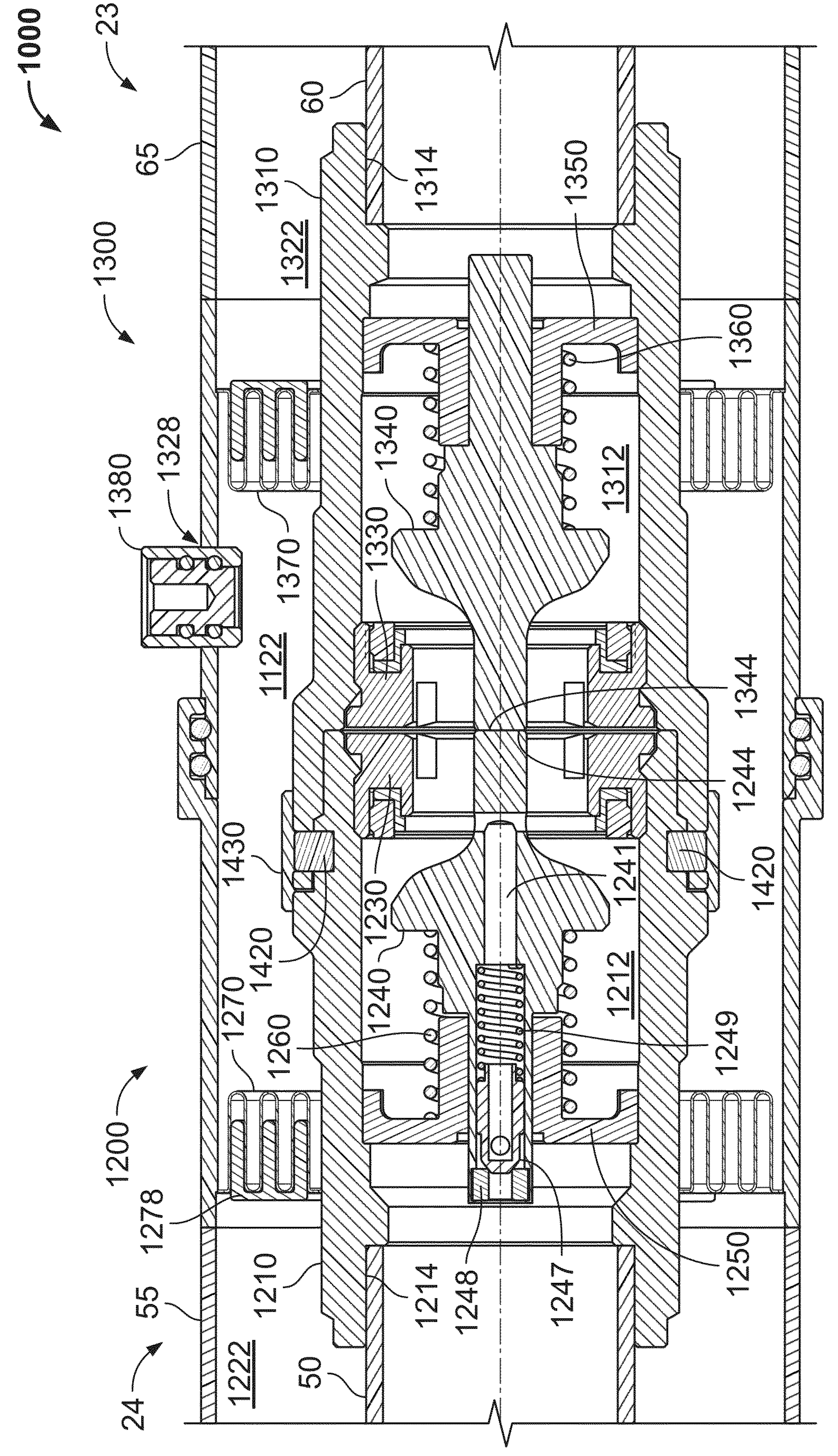
FIG. 25 depicts the nozzle-side valve of FIG. 17 and the tank-side valve of FIG. of the breakaway valve of FIG. 24 coupled together.

FIGS. 17-25 depict the example breakaway valve 1000 in accordance with the teachings herein. More specifically, FIGS. 17-21 depicts the example nozzle-side valve 1200 as disclosed herein, FIGS. 22-23 depict the example tank-side valve 1300 as disclosed herein, and FIGS. 24-25 depict the nozzle-side valve 1200 and the tank-side valve 1300 coupled together.

Figure 17:
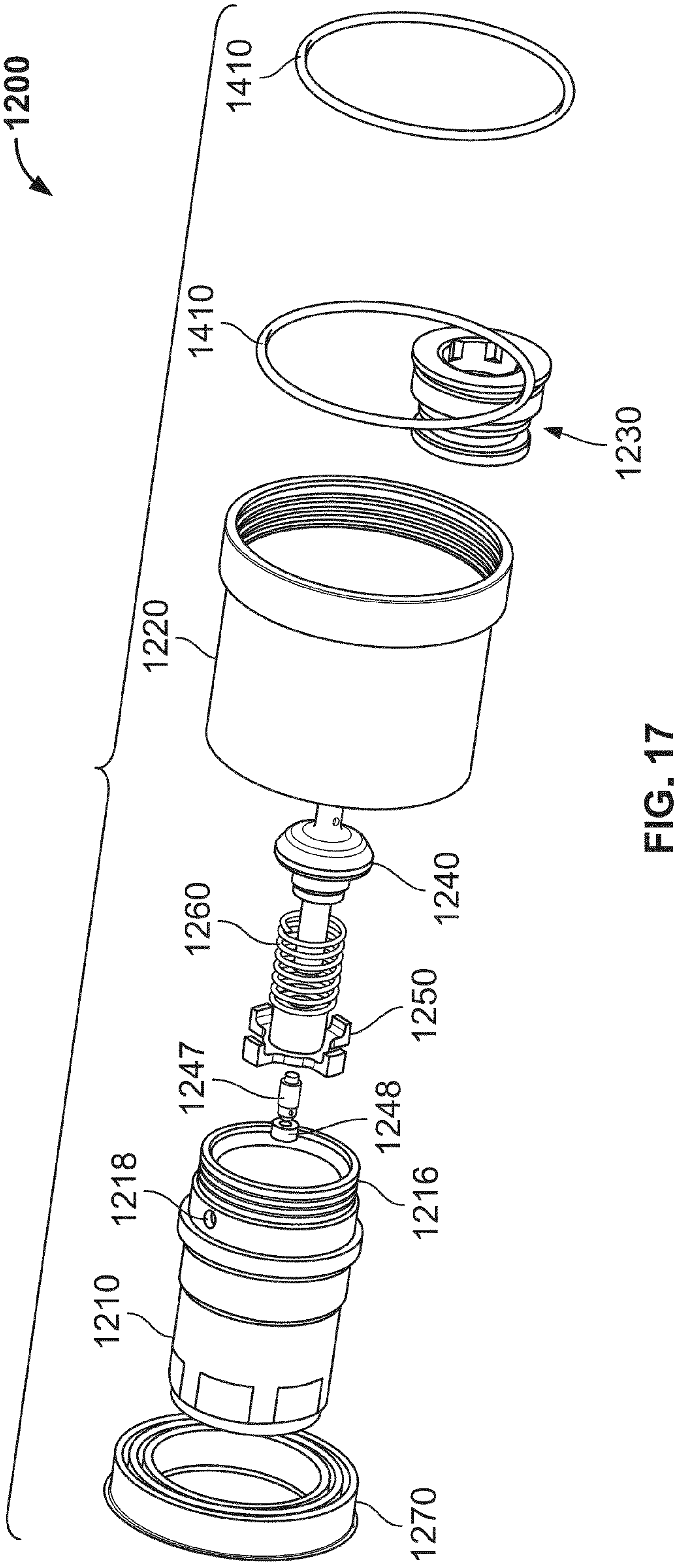
FIG. 17 is an exploded perspective view of a nozzle-side valve of another example breakaway valve of in accordance with the teachings herein.

As shown in FIG. 17, the nozzle-side valve 1200 includes a valve body 1210, an outer jacket 1220, a valve seat 1230, a poppet 1240, a poppet support 1250, a spring 1260, and a jacket support 1270. The valve body 1210, the outer jacket 1220, the valve seat 1230, the poppet support 1250, and the spring 1260 of the nozzle-side valve 1200 are identical and/or substantially similar to the valve body 210, the outer jacket 220, the valve seat 230, the poppet support 250, and the spring 260, respectively, of the nozzle-side valve 200. Because those components of the nozzle-side valve 200 have been described in detail in connection with FIGS. 2-11 and 14-16, some features of the respective components of the nozzle-side valve 1200 are not described in further detail below for conciseness purposes.

As also shown in FIG. 17, the breakaway valve 1000 also includes one or more seals 1410, which are identical and/or substantially similar to the one or more seals 410 of the breakaway valve 100. Because the seals 410 have been described in detail in connection with FIGS. 8, 11, and 15, some features of the seals 1410 are not described in further detail below for conciseness purposes.

Figure 18:
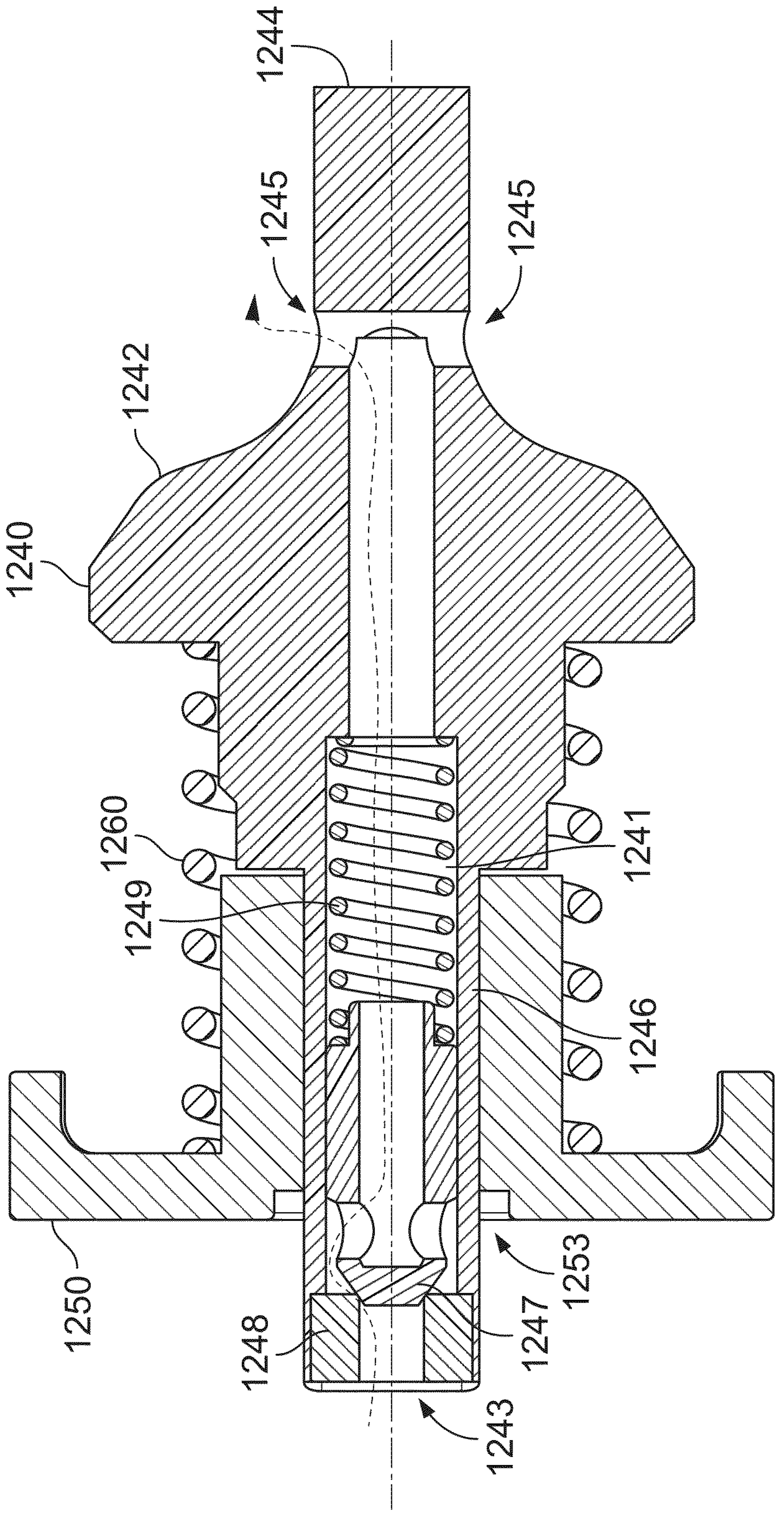
FIG. 18 is a side cross-section view of a poppet of the nozzle-side valve of FIG. 17.

FIG. 18 depicts a cross-section of the poppet 1240, the poppet support 1250, and the spring 1260 assembled together when the poppet 1240 is in an open position. In the illustrated example, the poppet 1240 includes a poppet body 1242, a stem 1244, a shaft 1246, and a pressure relief valve.

The poppet body 1242, the stem 1244, and the shaft 1246 are integrally formed together. The shaft 1246 extends from a backside of the poppet body 1242 along a longitudinal axis of the poppet 1240. The shaft 1246 is configured to be slidably received by a through-hole 1253 of the poppet support 1250. A frontside of the poppet body 1242 defines a sealing surface that is configured to sealingly engage the valve seat 1230 in a closed position. The stem 1244 extends from the frontside of the poppet body 1242 along the longitudinal axis of the poppet 1240 and is configured to engage a respective stem of the tank-side valve 1300 (e.g., a stem 1344 of FIG. 25) when the nozzle-side valve 1200 and the tank-side valve 1300 are coupled together in an open position.

The pressure relief valve of the poppet 1240 is configured to release pressure built up from cryogenic fluid that would otherwise be trapped within the jacketed hose 24 between uses. In turn, by releasing the pressure that would otherwise build up within the jacketed hose 24, the pressure relief valve of the poppet 1240 deters the jacketed hose 24 from breaking due to elevated pressure levels. In the illustrated example, the poppet 1240 defines a chamber 1241 that extends through the poppet body 1242, the stem 1244, and the shaft 1246 of the poppet 1240. The shaft 1246 defines an inlet 1243 of the chamber 1241, and the stem 1244 defines an outlet 1245 of the chamber 1241. The pressure relief valve includes a plug 1247, a seat 1248, and a spring 1249 disposed within the chamber 1241. The seat 1248 is positioned adjacent the inlet 1243. For example, the seat 1248 is securely coupled to the shaft 1246 via riveting and/or other means. The spring 1249 is configured to bias the plug 1247 against the seat 1248. For example, the spring 1249 applies a biasing force to the plug 1247.

When a pressure of the cryogenic fluid within the jacketed hose 24 is less than the biasing force, the spring 1249 pushes the plug 1247 to sealingly engage the seat 1248, thereby preventing fluid from being released from the jacketed hose 24 and through the chamber 1241. The seat 1248 is composed of polychlorotrifluoroethylene and/or any other material that is configured to form a tight seal with the plug 1247 in extremely cold temperatures of the cryogenic fluid. When a pressure of the cryogenic fluid within the jacketed hose 24 is greater than the biasing force, the pressure within the jacketed hose 24 pushes the plug 1247 to disengage from the seat 1248, thereby opening the pressure relief valve and enabling fluid trapped within the jacketed hose 24 to be safely released through the chamber 1241.

Figure 19:
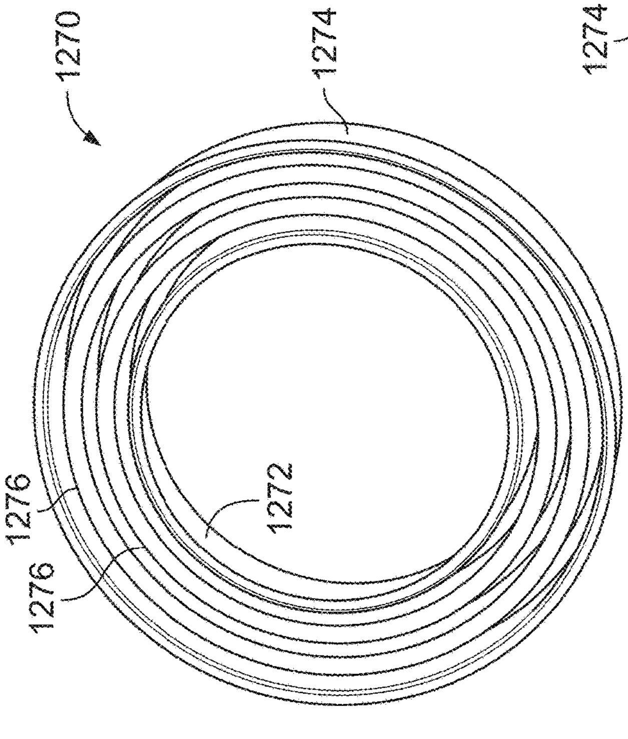
FIG. 19 depicts a jacket support of the nozzle-side valve of FIG. 17.
Figure 20:
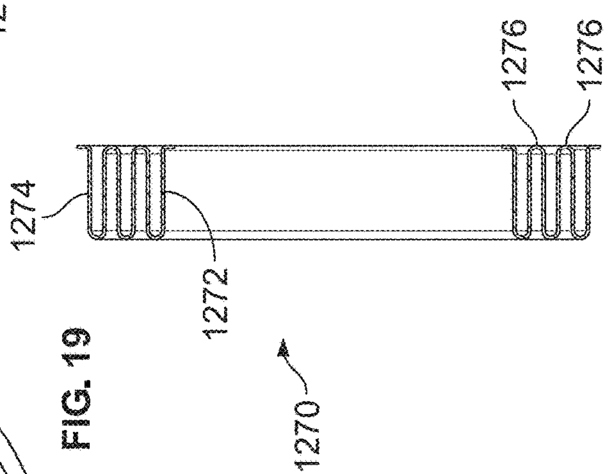
FIG. 20 is a cross-section side view of the jacket support of FIG. 19.

FIGS. 19-21 depict the jacket support 1270 of the illustrated example. The jacket support 1270 is positioned between and engages an outer surface of the valve body 1210 (also referred to as a "nozzle-side valve body") and an inner surface of the outer jacket 1220 to securely position the outer jacket 1220 around a portion of the valve body 1210. The jacket support 1270 forms an end of a vacuum-insulation layer 1222 (also referred to as a "jacket-insulated layer," a "sealed vacuum insulation layer," a "sealed insulation layer," and "a vacuum-insulation sealed layer") that extends over a proximal end of the nozzle-side valve 1200 and at least a portion of the jacketed hose 24 toward the nozzle 26. The jacket support 1270 includes an inner surface 1272 that is coupled to the valve body 1210 (e.g., via welding) and an outer surface 1274 that is coupled to the outer jacket 1220 (e.g., via welding).

The vacuum-insulation layer 1222 is formed by the outer surface of the valve body 1210, the jacket support 1270, a portion of the outer jacket 1220 adjacent a second end of the outer jacket 1220, the inner body 50 of the jacketed hose 24, and the outer jacket 55 of the jacketed hose 24. That is, the vacuum-insulation layer 1222 is formed at least partially by the valve body 1210, the outer jacket 1220, and the jacket support 1270. The vacuum-insulation layer 1222 extends along a portion of the valve body 1210 and at least a portion of the jacketed hose 24. The vacuum-insulation layer 1222 provides a layer of insulation around the jacketed hose 24 and the valve body 1210 of the nozzle-side valve 1200, for example, to facilitate the operator 40 in safely grasping the jacketed hose 24 and/or the nozzle-side valve 1200. For example, the vacuum of the vacuum-insulation layer 1222 is formed by a vacuum valve (also referred to as an "evacuation port") positioned along the outer jacket 1220 of the nozzle-side valve 1200 and/or the outer jacket 55 of the jacketed hose 24. For example, the vacuum valve may be similar in structure and/or operation to the evacuation port 1380 of FIG. 23. The jacket support 1270 is securely and sealingly coupled to the valve body 1210 and the outer jacket 1220 (e.g., via welding) to maintain the vacuum of the vacuum-insulation layer 1222 after the tank-side valve 1300 has decoupled from the nozzle-side valve 1200 due to a breakaway event.

The jacket support 1270 includes bellows 1276 that are configured to reduce heat transfer with a vacuum-insulation layer 1122 (e.g., also referred to as a "sealed insulation layer") and/or the vacuum-insulation layer 1222. In the illustrated example, the jacket support 1270 is formed from a relatively thin sheet of material (e.g., about 0.2 mm of stainless steel) with between about two to five of the bellows 1276. In other examples, the jacket support 1270 is composed of a thicker sheet of material (e.g., about 1.5 mm of stainless steel) that is shaped to form a circumferential groove. Additionally, in some examples as shown in FIG. 21, the jacket support 1270 includes one or more bellow supports 1278 that provide structural support to the bellows 1276. For example, the bellow supports 1278 are formed of a plastic material, such as ultra-high-molecular-weight-polyethylene (UHMWPE), and includes teeth that are inserted between and engage the bellows 1276 to provide structural support to the bellows 1276.

Turning to FIG. 22, the example tank-side valve 1300 disclosed herein includes a valve body 1310, an outer jacket 1320, a valve seat 1330, a poppet 1340, a poppet support 1350, a spring 1360, a jacket support 1370, and a vacuum valve 1380 (also referred to as an "evacuation port"). The valve body 1310, the outer jacket 1320, the valve seat 1330, the poppet 1340, the poppet support 1350, and the spring 1360 of the tank-side valve 1300 are identical and/or substantially similar to the valve body 310, the outer jacket 320, the valve seat 330, the poppet 340, the poppet support 350, and the spring 360, respectively, of the tank-side valve 300. Because those components of the tank-side valve 300 have been described in detail in connection with FIGS. 2-7 and 12-16, some features of the respective components of the tank-side valve 1300 are not described in further detail below for conciseness purposes.

A jacket support 1370 is positioned between and engages an outer surface of the valve body 1310 (also referred to as a "tank-side valve body") and an inner surface of the outer jacket 1320 to securely position the outer jacket 1320 around a portion of the valve body 1310. The jacket support 1370 forms an end of a vacuum-insulation layer 1322 (also referred to as a "jacket-insulated layer," a "sealed vacuum insulation layer," and "a vacuum-insulation sealed layer") that extends over a proximal end of the tank-side valve 1300 and at least a portion of the jacketed hose 23 toward the storage tank 22. The jacket support 1370 includes an inner surface that is coupled to the valve body 1310 (e.g., via welding) and an outer surface that is coupled to the outer jacket 1320 (e.g., via welding).

The vacuum-insulation layer 1322 is formed by the outer surface of the valve body 1310, the jacket support 1370, a portion of the outer jacket 1320 adjacent a second end of the outer jacket 1320, the inner body 60 of the jacketed hose 23, and the outer jacket 65 of the jacketed hose 23. That is, the vacuum-insulation layer 1322 is formed at least partially by the valve body 1310, the outer jacket 1320, and the jacket support 1370. The vacuum-insulation layer 1322 extends along a portion of the valve body 1310 and at least a portion of the jacketed hose 23. The vacuum-insulation layer 1322 provides a layer of insulation around the jacketed hose 23 and the valve body 1310 of the tank-side valve 1300, for example, to facilitate the operator 40 in safely grasping the jacketed hose 23 and/or the tank-side valve 1300. For example, the vacuum of the vacuum-insulation layer 1322 is formed by a vacuum valve (also referred to as an "evacuation port") positioned along the outer jacket 1320 of the tank-side valve 1300 and/or the outer jacket 65 of the jacketed hose 23. For example, the vacuum valve may be similar in structure and/or operation to the evacuation port 1380 of FIG. 23. The jacket support 1370 is securely and sealingly coupled to the valve body 1310 and the outer jacket 1320 (e.g., via welding) to maintain the vacuum of the vacuum-insulation layer 1322 after the tank-side valve 1300 has decoupled from the nozzle-side valve 1200 due to a breakaway event.

As also shown in FIG. 22, the breakaway valve 1000 also includes pins 1420 and a sleeve 1430, which are identical and/or substantially similar to the pins 420 and the sleeve 430, respectively, of the breakaway valve 100. Because the pins 420 and the sleeve 430 have been described in detail in connection with FIGS. 2-16, some features of the pins 1420 and the sleeve 1430 are not described in further detail below for conciseness purposes.

FIG. 23 depicts a cross-section of the vacuum valve 1380 that includes a valve body 1382, a poppet 1384, an O-ring 1386, and an O-ring 1388. As disclosed below in greater detail with respect to FIG. 25, the vacuum valve 1380 is configured to form a vacuum within the vacuum-insulation layer 1122 that extends around the valve body 1210 and the valve body 1310 to facilitate the operator 40 in safely grasping the nozzle-side valve 1200 and/or the tank-side valve 1300 of the breakaway valve 1000. Returning to FIG. 23, the poppet 1384 is configured to slide within the valve body 1382 to enable air to flow out of the vacuum-insulation layer 1122 to form the vacuum. The O-rings 1386, 1388 form a sealed connection between the poppet 1384 and the valve body 1382.

FIG. 24 depicts the nozzle-side valve 1200 and the tank-side valve 1300 when decoupled from each other. When the nozzle-side valve 1200 and the tank-side valve 1300 are decoupled from each other, both the nozzle-side valve 1200 and the tank-side valve 1300 are in respective closed positions. The poppet 1240 engages the valve seat 1230 when the nozzle-side valve 1200 is in a respective closed position to limit the amount of cryogenic fluid that can escape out of the valve body 1210 of the nozzle-side valve 1200 during a breakaway event. The poppet 1340 engages the valve seat 1330 when the tank-side valve 1300 is in a respective closed position to prevent cryogenic fluid from escaping out of the valve body 1310 of the tank-side valve 1300 during a breakaway event.

FIG. 25 depicts the nozzle-side valve 1200 and the tank-side valve 1300 when coupled together to enable a filling event at the filling station 20. For example, when the filling station 20 is in an operational state, a fitting 1214 of the nozzle-side valve 1200 is coupled to the inner body 50 of the jacketed hose 24, a fitting 1314 of the tank-side valve 1300 is coupled to the inner body 60 of the jacketed hose 23, and the nozzle-side valve 1200 is securely coupled to the tank-side valve 1300. For example, (1) the fitting 1214 is welded to an end of the inner body 50 of the jacketed hose 24 and (2) the connection and the inner body 50 are wrapped with insulating material to seal and insulate the connection between the jacketed hose 24 and the valve body 1210. Additionally, (1) the fitting 1314 is welded to an end of the inner body 60 of the jacketed hose 23 and (2) the connection and the inner body 50 are wrapped with insulating material to seal and insulate the connection between the jacketed hose 23 and the valve body 1310. When the nozzle-side valve 1200 and the tank-side valve 1300 are coupled together, each of the nozzle-side valve 1200 and the tank-side valve 1300 is in a respective open position to enable cryogenic fluid to flow from the storage tank 22, through the breakaway valve 1000, and through the jacketed hose 24 to conduct a filling event. In the coupled state, the stem 1244 of the nozzle-side valve 1200 engages a stem 1344 of the tank-side valve 1300. In turn, the poppet 1340 of the tank-side valve 1300 applies a force to the poppet 1240 that overcomes the biasing force of the spring 1260 and pushes the poppet 1240 to disengage from the valve seat 1230. Likewise, the poppet 1240 of the nozzle-side valve 1200 applies a force to the poppet 1340 that overcomes the biasing force of the spring 1360 and pushes the poppet 1340 to disengage from the valve seat 1330.

When the nozzle-side valve 1200 and the tank-side valve 1300 are coupled together, a rim 1216 of the valve body 1210 engages a rim 1316 of the valve body 1310 to fluidly connect a chamber 1212 of the nozzle-side valve 1200 and a chamber 1312 of the tank-side valve 1300 in a sealed manner. The seals 1410 sealingly engage both the outer jacket 1220 and the outer jacket 1320 to form the vacuum-insulation layer 1122 when the nozzle-side valve 1200 is coupled to the tank-side valve 1300. For example, the vacuum-insulation layer 1122 is formed at least partially by the valve body 1210, the outer jacket 1220, the jacket support 1270, the valve body 1310, the outer jacket 1320, and the jacket support 1370 when the nozzle-side valve 1200 and the tank-side valve 1300 are coupled together. The vacuum valve 1380 extends through a hole 1328 of the outer jacket 1320 and is coupled to the outer jacket 1320 (e.g., via welding) to enable the vacuum valve 1380 to form a vacuum in the vacuum-insulation layer 1122 after the nozzle-side valve 1200 is coupled to the tank-side valve 1300.

To securely couple the nozzle-side valve 1200 and the tank-side valve 1300 together, each of the pins 1420 (also referred to as “shear pins”) is configured to extend simultaneously through a respective through-hole 1318 of the tank-side valve 1300 and into a respective blind hole 1218 of the nozzle-side valve 1200. The valve body 1210 of the nozzle-side valve 1200 defines the blind holes 1218, and the valve body 1310 of the tank-side valve 1300 defines the through-holes 1318. Additionally, the sleeve 1430 is configured to be positioned over the pins 1420 to retain the pins 1420 within the blind holes 1218 and the through-holes 1318.

In the illustrated example, the nozzle-side valve 1200 is configured to be fluidly connected to one side of the system 10, for example the nozzle 26, and the tank-side valve 1300 is configured to be fluidly connected to another side of the system 10, for example the storage tank 22. The terms “nozzle-side valve” and “tank-side valve” are used for convenience and are not intended to be limiting. Additionally, in the illustrated example, the tank-side valve 1300 is a first valve with a first valve body that defines the through-holes 1318 for the pins 1420, and the nozzle-side valve 1200 is a second valve with a second valve body that defines the blind holes 1218 for the pins 1420. In other examples, a nozzle-side valve may be a first valve with a first valve body that defines through-holes for the pins 1420, and a tank-side valve may be a second valve with a second valve body that defines blind holes for the pins 1420.

The pins 1420 are configured to break when a threshold force or greater is applied to the breakaway valve 1000. The threshold force corresponds with a force of a breakaway event. The pins 1420 are configured to break when a force associated with a breakaway event is applied to enable the jacketed hose 24 to disconnect from the jacketed hose 23 in a manner that limits the amount of cryogenic fluid that is discharged during a breakaway event. The threshold force at which the pins 1420 break apart corresponds with a quantity, size, shape, and composition of the pins 1420. For example, the pins 1420 are composed of a plastic material that enables the pins 1420 to break apart at a desired force.

In operation, the pins 1420 break when at least the threshold force is applied by pulling the nozzle 26 in a direction away from the storage tank 22. When the pins 1420 have broken apart, the nozzle-side valve 1200, which remains connected to the jacketed hose 24, is no longer securely coupled to the tank-side valve 1300, which remains connected to the jacketed hose 23. In turn, the nozzle-side valve 1200 decouples from the tank-side valve 1300, and the jacketed hose 24 is pulled apart from the jacketed hose 23. When the nozzle-side valve 1200 decouples from the tank-side valve 1300, the poppet 1240 reengages the valve seat 1230 to reclose the end of the nozzle-side valve 1200 and the poppet 1340 reengages the valve seat 1330 to reclose the end of the tank-side valve 1300. In the closed positions, the nozzle-side valve 1200 limits the amount of cryogenic fluid that can be discharged from a respective end of the jacketed hose 24 and the tank-side valve 1300 prevents cryogenic fluid from being discharged from the storage tank 22. Additionally, when the nozzle-side valve 1200 decouples from the tank-side valve 1300, (1) the jacket support 1270 remains secured to maintain the vacuum of the vacuum-insulation layer 1222 that extends from the nozzle-side valve 1200 and covers at least a portion of the jacketed hose 24 and (2) the jacket support 1370 remains secured to maintain the vacuum 1322 that extends from the tank-side valve 1300 and covers at least a portion of the jacketed hose 23.

In the illustrated example, the poppet 1240 of the nozzle-side valve 1200 includes a pressure relief valve, and the poppet 1340 of the tank-side valve 1300 does not include any such pressure relief valve. As discussed above in further detail, the pressure relief valve of the nozzle-side valve 1200 releases pressure that builds up from cryogenic fluid trapped within the jacketed hose 24, thereby deterring the jacketed hose 24 from breaking due to elevated pressure levels. With respect to the tank-side valve 1300, any cryogenic fluid that is trapped by the poppet 1340 being in the closed position returns to the storage tank 22.

Figure 26:
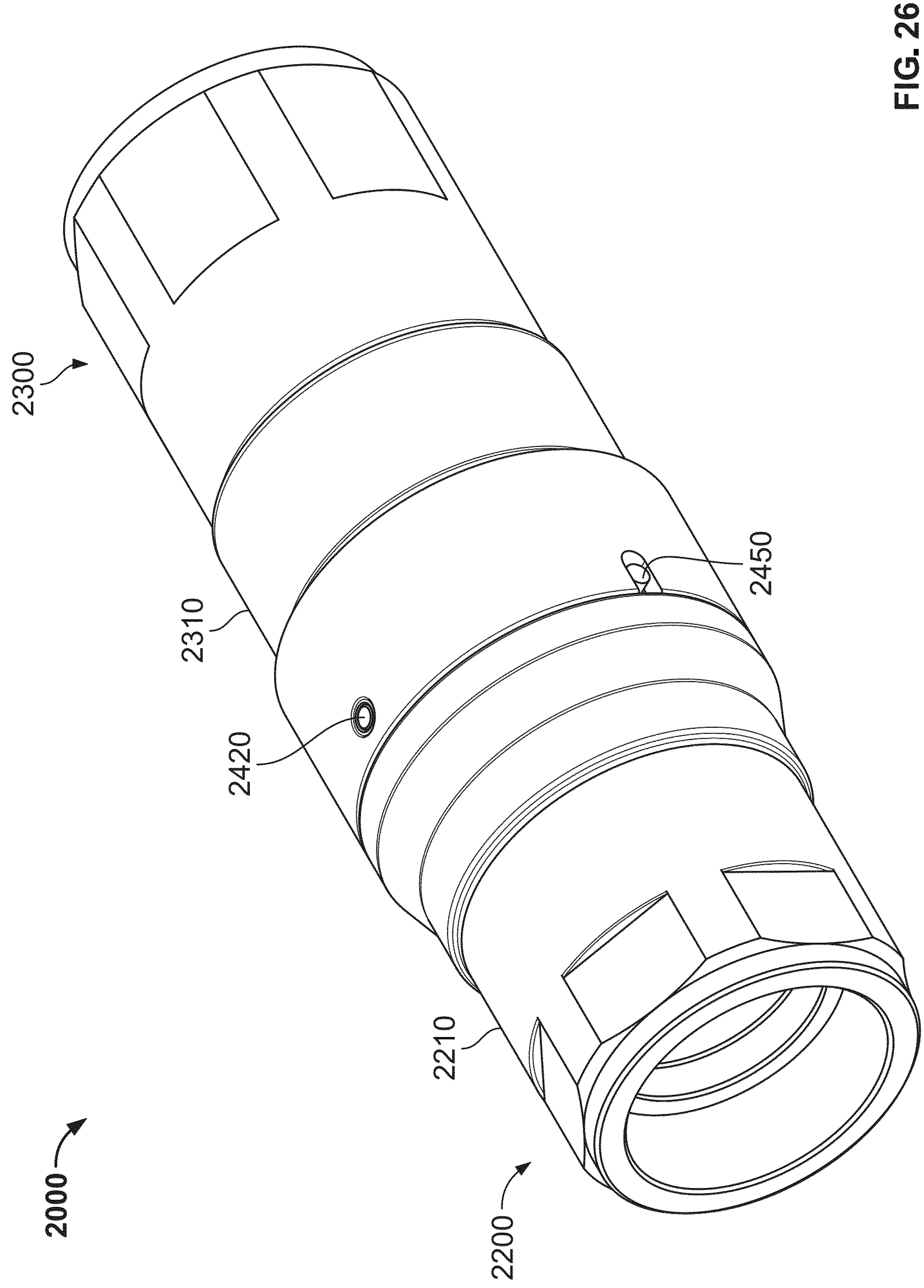
FIG. 26 is a perspective view of another example breakaway valve of the system of FIG. 1 having a nozzle-side valve and a tank-side valve and with outer jackets removed, in accordance with the teachings herein.
Figure 27:
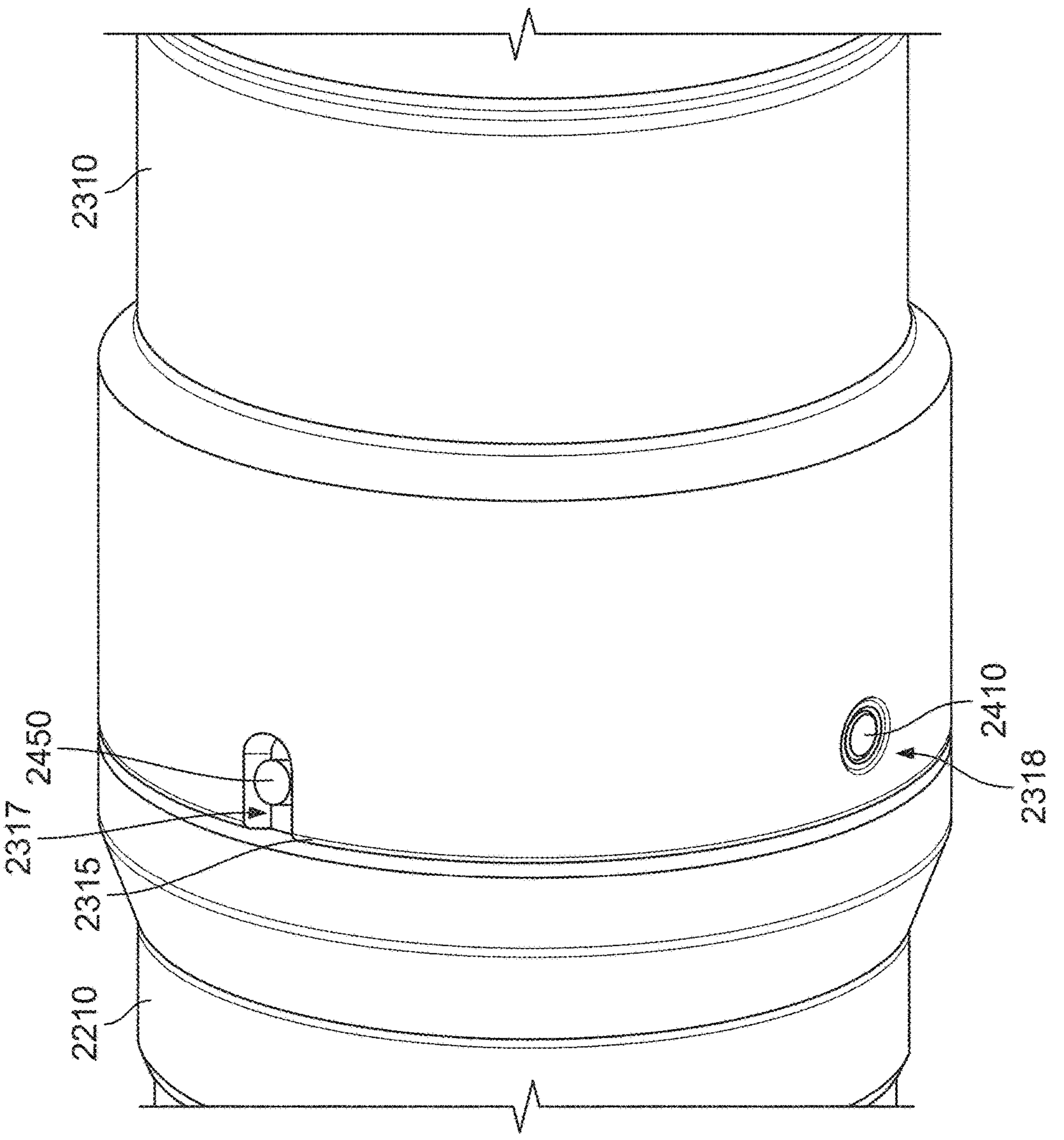
FIG. 27 is an expanded view of the nozzle-side valve and the tank-side valve of the breakaway valve of FIG. 26 coupled together via pins.
Figure 28:
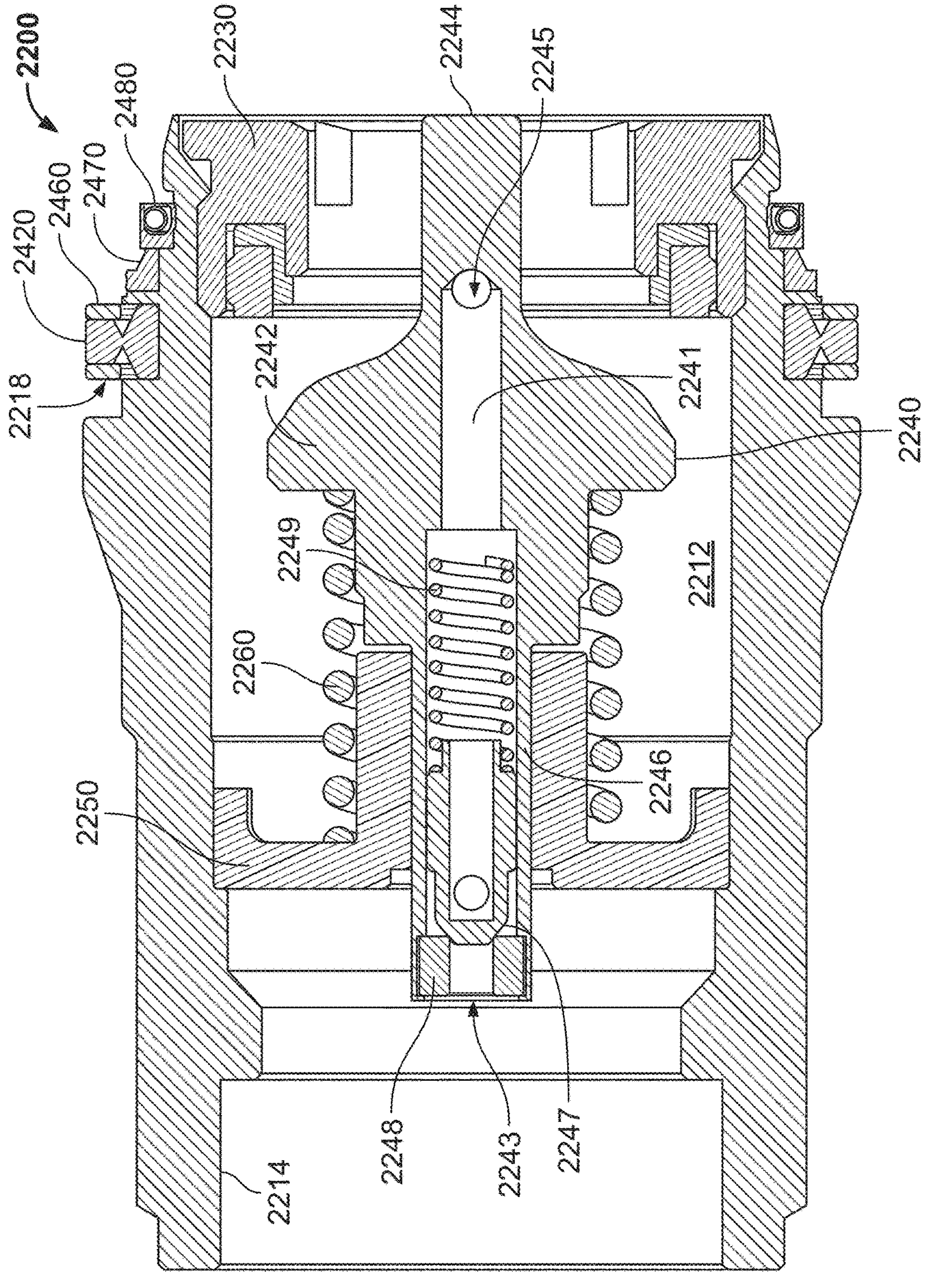
FIG. 28 is a side cross-sectional view of the nozzle-valve of the breakaway valve of FIG. 26 in an open position.
Figure 29:
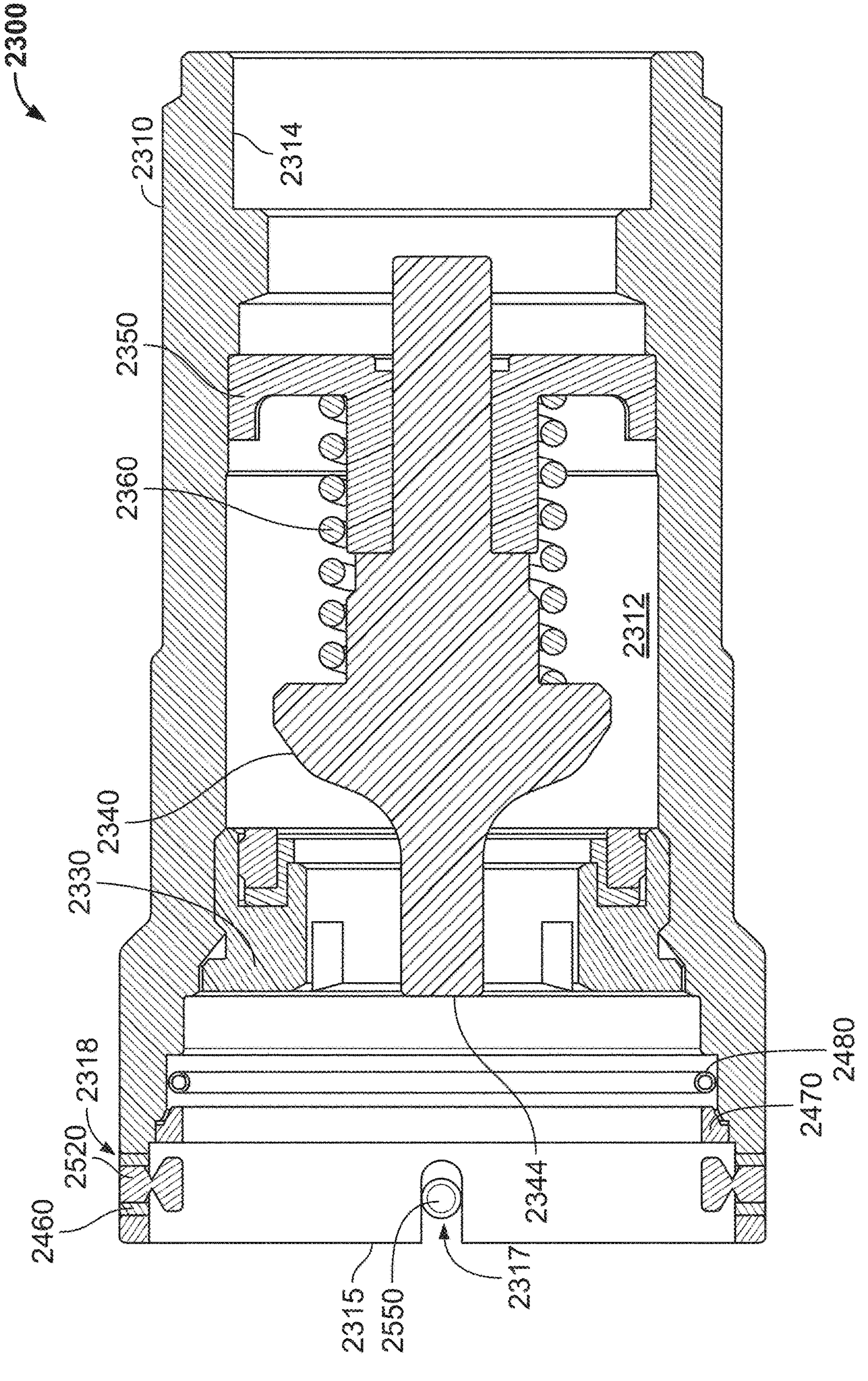
FIG. 29 is a side cross-sectional view of the tank-valve of the breakaway valve of FIG. 26 in an open position.
Figure 30:
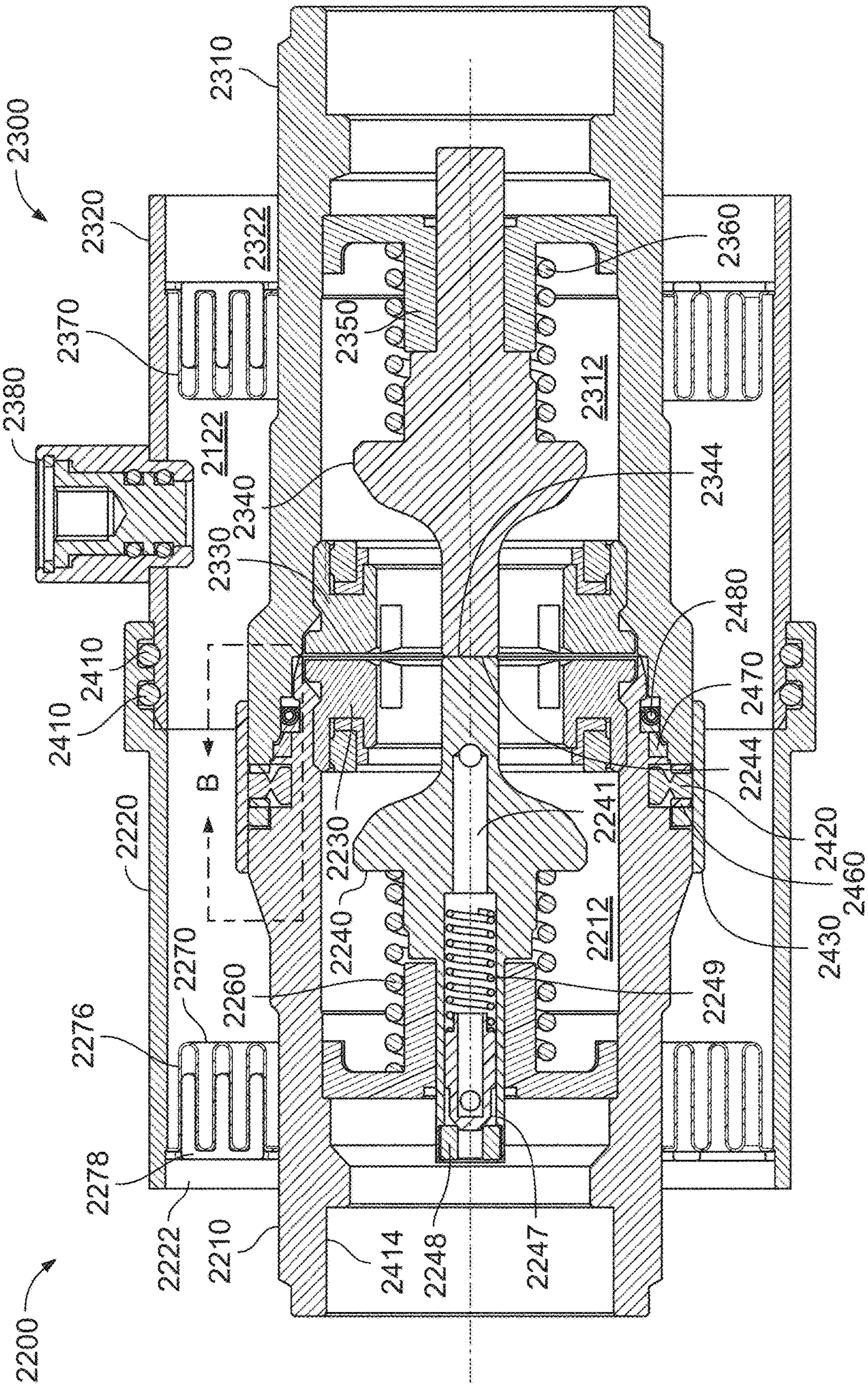
FIG. 30 is a side cross-sectional view of the nozzle-valve and the tanks-side valve of the breakaway valve of FIG. 26 coupled together.
Figure 31:
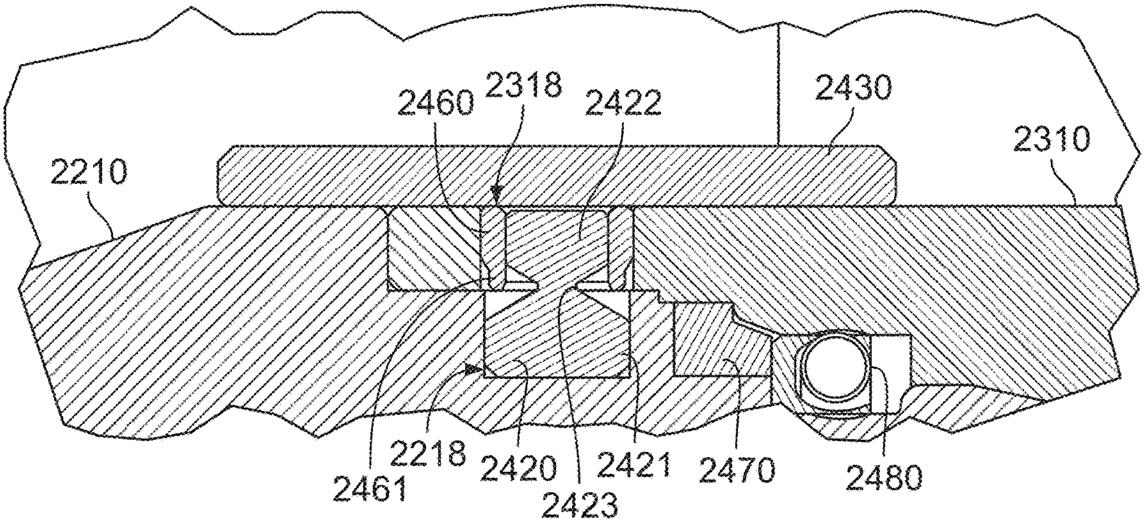
FIG. 31 is an expanded side cross-sectional view of shear pins of the breakaway valve of FIG. 26.
Figure 32:
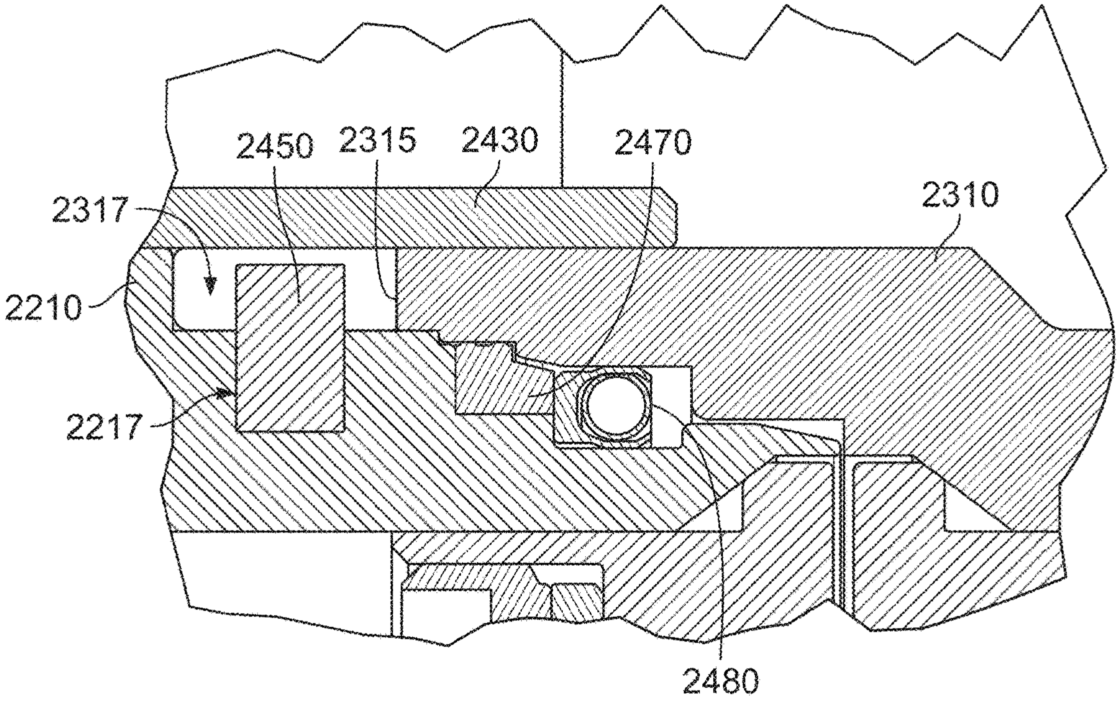
FIG. 32 is an expanded side cross-sectional view of anti-rotation pins of the breakaway valve of FIG. 26.

FIGS. 26-32 depict the example breakaway valve 2000 in accordance with the teachings herein for use between the storage tank 22 and the nozzle 26 of a cryogenic-fluid dispensing system. More specifically, FIGS. 26-27 depicts a valve body 2210 (also referred to as a “nozzle-side valve body”) of the example nozzle-side valve 2200 and a valve body 2310 (also referred to as a “tank-side valve body”) of the example tank-side valve 2300 coupled together. FIG. 28 depicts the example nozzle-side valve 2200 that is configured to be fluidly connected to one side of the system 10, for example the nozzle 26, and FIG. 29 depicts the example tank-side valve 2300 that is configured to be fluidly connected to another side of the system 10, for example the storage tank 22. The terms “nozzle-side valve” and “tank-side valve” are used for convenience and are not intended to be limiting. FIG. 30 depicts the nozzle-side valve 1200 and the tank-side valve 1300 coupled together. FIG. 31 depicts shear pins 2420 of the breakaway valve 2000, and FIG. 32 depicts anti-rotation pins 2450 of the breakaway valve 2000.

As shown in FIGS. 28 and 30, the nozzle-side valve 2200 includes a valve body 2210, an outer jacket 2220, a valve seat 2230, a poppet 2240, a poppet support 2250, and a spring 2260. Those components are identical and/or substantially similar to the valve body 210, the outer jacket 220, the valve seat 230, the poppet 240, the poppet support 250, and the spring 260, respectively, of the nozzle-side valve 200. Those components are also identical and/or substantially similar to the valve body 1210, the outer jacket 1220, the valve seat 1230, the poppet 1240, the poppet support 1250, and the spring 1260, respectively, of the nozzle-side valve 1200. For example, the poppet 2240 includes a chamber 2241, a poppet body 2242, an inlet 2243, a stem 2244, an outlet 2245, and a shaft 2246 that are identical and/or substantially similar to the chamber 1241, the poppet body 1242, the inlet 1243, the stem 1244, the outlet 1245, and the shaft 1246, respectively, of the poppet 1240. Because those components of the nozzle-side valve 200 have been described in detail in connection with FIGS. 2-11 and 14-16 and those components of the nozzle-side valve 1200 have been described in detail in connection with FIGS. 17-18 and 24-25, some features of the respective components of the nozzle-side valve 2200 are not described in further detail below for conciseness purposes.

The nozzle-side valve 2200 also includes a pressure relief valve of the valve body 2210 that is identical and/or substantially similar to the pressure relief valve of the valve body 1210. For example, the pressure relief valve of the valve body 2210 includes a plug 2247, a seat 2248, and a spring 2249 that are identical and/or substantially similar to the plug 1247, the seat 1248, and the spring 1249, respectively, of the valve body 1210. Because those components of the pressure relief valve of the valve body 1210 have been described in detail in connection with FIGS. 18 and 25, some features of the respective components of the pressure relief valve of the valve body 2210 are not described in further detail below for conciseness purposes.

As shown in FIG. 30, the nozzle-side valve 2200 also includes a jacket support 2270 and a vacuum-insulation layer 2222 that are identical and/or substantially similar to the jacket support 1270 and the vacuum-insulation layer 1222, respectively, of the nozzle-side valve 1200. For example, the jacket support 2270 includes bellows 2276 and bellow supports 2278 that are identical and/or substantially similar to the bellows 1276 and the bellow supports 1278, respectively, of the jacket support 1270. Further, the vacuum-insulation layer 2222 is formed by the outer jacket 2220 and the jacket support 2270 with the jacketed hose 24 when the nozzle-side valve 2200 is connected to the jacketed hose 24. Because those components of the nozzle-side valve 1200 have been described in detail in connection with FIGS. 17, 19-21, and 24-25, some features of the respective components of the jacket support 2700 are not described in further detail below for conciseness purposes.

As shown in FIGS. 29 and 30, the tank-side valve 2300 includes a valve body 2310, an outer jacket 2320, a valve seat 2330, a poppet 2340, a poppet support 2350, and a spring 2360. Those components are identical and/or substantially similar to the valve body 310, the outer jacket 320, the valve seat 330, the poppet 340, the poppet support 350, and the spring 360, respectively, of the tank-side valve 300. Those components are also identical and/or substantially similar to the valve body 1310, the outer jacket 1320, the valve seat 1330, the poppet 1340, the poppet support 1350, and the spring 1360, respectively, of the nozzle-side valve 1200. For example, the poppet 2340 includes a stem 2244 that is identical and/or substantially similar to the stem 1244 of the poppet 1240. Because those components of the nozzle-side valve 200 have been described in detail in connection with FIGS. 2-7 and 12-16 and those components of the nozzle-side valve 1200 have been described in detail in connection with FIGS. 22 and 24-25, some features of the respective components of the tank-side valve 2300 are not described in further detail below for conciseness purposes.

As shown in FIG. 30, the tank-side valve 2300 also includes a jacket support 2370, a vacuum valve 2380, and a vacuum-insulation layer 2322 that are identical and/or substantially similar to the jacket support 1370, the vacuum valve 1380, and the vacuum-insulation layer 1322, respectively, of the tank-side valve 1300. For example, the vacuum-insulation layer 2322 is formed by the outer jacket 2320 and the jacket support 2370 with the jacketed hose 23 when the tank-side valve 2300 is connected to the jacketed hose 23. Because those components of the tank-side valve 1300 have been described in detail in connection with FIGS. 22-25, some features of the respective components of the jacket support 2370 are not described in further detail below for conciseness purposes.

The breakaway valve 2000 also includes one or more seals 2410 and a sleeve 2430 that are identical and/or substantially similar to the one or more seals 410 and the sleeve 430 of the breakaway valve 100 and the one or more seals 1410 and the sleeve 1430 of the breakaway valve 1000. For example, the sleeve 2430 is configured to be slidably positioned over pins (e.g., shear pins 2420 and anti-rotation pins 2450) to retain those pins in place. Because the seals 410, 1410 and the sleeves 430, 1430 have been described in detail in connection with FIGS. 5-8, 11, 15, 17, and 24-25, respectively, some features of the seals 2410 are not described in further detail below for conciseness purposes. Additionally, the breakaway valve 2000 includes a vacuum-insulation layer 2122 that is identical and/or substantially similar to the vacuum-insulation layer 1122 of the breakaway valve 1000. Because the vacuum-insulation layer 1122 has been described in detail in connection with FIG. 25, some features of the vacuum-insulation layer 2122 are not described in further detail below for conciseness purposes.

When the nozzle-side valve 2200 and the tank-side valve 2300 are decoupled from each other, both the nozzle-side valve 2200 and the tank-side valve 2300 are in respective closed positions. The poppet 2240 engages the valve seat 2230 when the nozzle-side valve 2200 is in a respective closed position to limit the amount of cryogenic fluid that can escape out of the valve body 2210 of the nozzle-side valve 2200 during a breakaway event. The poppet 2340 engages the valve seat 2330 when the tank-side valve 2300 is in a respective closed position to prevent cryogenic fluid from escaping out of the valve body 2310 of the tank-side valve 2300 during a breakaway event.

FIG. 30 depicts the nozzle-side valve 2200 and the tank-side valve 2300 when coupled together to enable a filling event at the filling station 20. For example, when the filling station 20 is in an operational state, a fitting 2214 of the nozzle-side valve 2200 is coupled to the inner body 50 of the jacketed hose 24 (FIG. 25), a fitting 2314 of the tank-side valve 2300 is coupled to the inner body 60 of the jacketed hose 23 (FIG. 25), and the nozzle-side valve 2200 is securely coupled to the tank-side valve 2300. When the nozzle-side valve 2200 and the tank-side valve 2300 are coupled together, each of the nozzle-side valve 2200 and the tank-side valve 2300 is in a respective open position to enable cryogenic fluid to flow from the storage tank 22, through the breakaway valve 2000, and through the jacketed hose 24 to conduct a filling event. In the coupled state, the stem 2244 of the nozzle-side valve 2200 engages a stem 2344 of the tank-side valve 2300. In turn, the poppet 2340 of the tank-side valve 2300 applies a force to the poppet 2240 that overcomes the biasing force of the spring 2260 and pushes the poppet 2240 to disengage from the valve seat 2230. Likewise, the poppet 2240 of the nozzle-side valve 2200 applies a force to the poppet 2340 that overcomes the biasing force of the spring 2360 and pushes the poppet 2340 to disengage from the valve seat 2330.

In the illustrated example, the poppet 2240 of the nozzle-side valve 2200 includes a pressure relief valve, and the poppet 2340 of the tank-side valve 2300 does not include any such pressure relief valve. The pressure relief valve of the nozzle-side valve 2200 releases pressure that builds up from cryogenic fluid trapped within the jacketed hose 24, thereby deterring the jacketed hose 24 from breaking due to elevated pressure levels. With respect to the tank-side valve 2300, any cryogenic fluid that is trapped by the poppet 2340 being in the closed position returns to the storage tank 22.

In the illustrated example, the breakaway valve 2000 includes one or more shear pins 2420 and one or more anti-rotation pins 2450 that are configured to secure the nozzle-side valve 2200 and the tank-side valve 2300 together. As shown in FIG. 31, each of the shear pins 2420 is configured to extend simultaneously through a respective through-hole 2318 of the tank-side valve 2300 and into a respective blind hole 2218 of the nozzle-side valve 2200. As shown in FIG. 32, each of the anti-rotation pins 2450 is configured to extend simultaneously through a respective notch 2317 of the tank-side valve 2300 and into a respective blind hole 2217 of the nozzle-side valve 2200. The valve body 2210 of the nozzle-side valve 2200 defines the blind holes 2218 (also referred to as a "first set of blind holes") for the shear pins 2420 and the blind holes 2217 (also referred to as a "second set of blind holes") for the anti-rotation pins 2450. As shown in FIGS. 26-27 and 31-32, the valve body 2310 of the tank-side valve 2300 defines the notches 2317 and the through-holes 2318. For example, the notches 2317 are defined along a distal edge 2315 of the valve body 2310, and the through-holes 2318 are defined adjacent to the distal edge 2315. Additionally, the sleeve 3430 is configured to be positioned over the shear pins 2420 and the anti-rotation pins 2450 to securely retain the shear pins 2420 within the blind holes 2218 and the through-holes 2318 and to securely retain the anti-rotation pins 2450 within the blind holes 2217 and the notches 2317.

In the illustrated example, the tank-side valve 2300 is a first valve with a first valve body that defines the through-holes 2318 for the shear pins 2420 and the notches 2317 for the anti-rotation pins 2450, and the nozzle-side valve 2200 is a second valve with a second valve body that defines the blind holes 2218 for the shear pins 2420 and the blind holes 2217 for the anti-rotation pins 2450. In other examples, a nozzle-side valve may be a first valve with a first valve body that defines through-holes for the shear pins 2420 and notches for the anti-rotation pins 2450, and a tank-side valve may be a second valve with a second valve body that defines blind holes for the shear pins 2420 and the anti-rotation pins 2450.

The shear pins 2420 are configured to break when a threshold axial force or greater (e.g., 250 pounds) is applied to the breakaway valve 2000. The threshold axial force corresponds with an axial force of a breakaway event. The shear pins 2420 are configured to shear apart when at least a predetermined axial force associated with a breakaway event is applied to enable the nozzle-side valve 2200 and the jacketed hose 24 to disconnect from the tank-side valve 2300 and the jacketed hose 23 in a manner that limits the amount of cryogenic fluid discharge during a breakaway event.

The threshold force at which the shear pins 2420 break apart corresponds with a quantity, size, shape, and composition of the shear pins 2420. As illustrated in FIG. 31, each of the shear pins 2420 has a substantially hourglass cross-section that facilitates the shear pin 2420 in consistently shearing when the predetermined axial force is applied. In the illustrated example, each of the shear pins 2420 includes a radially-inner portion 2421, a radially-outer portion 2422, and a radially-middle portion 2423 between the radially-inner portion 2421 and the radially-outer portion 2422. Both the radially-inner portion 2421 and the radially-outer portion 2422 are wider than the radially-middle portion 2423 to form the substantially hourglass cross-section. The radially-inner portion 2421 is configured to be received by and/or housed within a respective one of the blind holes 2218. The radially-outer portion 2422 is configured to be received by and/or housed within a respective one of the through-holes 2318.

In the illustrated example, the radially-inner portion 2421 is press fit into the respective blind hole 2218. The radially-inner portion 2421 is wider than the radially-outer portion 2422 to provide an alignment tolerance between the blind hole 2218 and the through-hole 2318 that facilitates insertion of the shear pin 2420 into the blind hole 2218 and the through-hole 2318. In the illustrated example, the breakaway valve 2000 includes a respective shear-pin ring 2460 for each of the shear pins 2420. Each shear-pin ring 2460 has a substantially hollow cylinder shape and is press fit between the radially-outer portion 2422 of the respective shear pin 2420 and the valve body 2210 in the respective through-hole 2318. The shear-pin ring 2460 is composed of polyether ether ketone (PEEK) and/or any other material that enables the shear-pin ring 2460 to securely retain the radially-outer portion 2422 of the respective shear pin 2420 in the respective through-hole 2318.

The anti-rotation pins 2450 are configured to break with the shear pins 2420 when a threshold torsional force or greater is applied to the breakaway valve 2000. The anti-rotation pins 2450 are configured to withstand up to at least a predetermined torsional force to deter the nozzle-side valve 2200 from separating from the tank-side valve 2300 before at least the predetermined shear force is applied. The anti-rotation pins 2450 are configured to withstand a greater torsional force compared to the shear pins 2420 so that the anti-rotation pins 2450 prevent the shear pins 2420 from breaking and, in turn, prevent the nozzle-side valve 2200 and the tank-side valve 2300 from separating when less than a predetermined torsional force is applied. To withstand a greater torsional force, each of the anti-rotation pins 2450 has a thickness (extending circumferentially about the breakaway valve 2000) that is greater than that of each of the shear pins 2420. As illustrated in FIG. 32, each of the anti-rotation pins 2450 also has a substantially-cylindrical cross-section to enable the anti-rotation pin 2450 to withstand up to the predetermined torsional force.

Each of the anti-rotation pins 2450 includes a radially-outer portion that is positioned in a respective one of the notches 2317. Each of the notches 2317 includes an open end along the distal edge 2315 of the valve body 2310. The anti-rotation pins 2450 are configured to slide through the open ends of the respective notches 2317 to prevent the anti-rotation pins 2450 from impeding separation of the nozzle-side valve 2200 and the tank-side valve 2300 when at least the predetermined axial force is applied. That is, the anti-rotation pins 2450 are configured to remain intact when the shear pins 2420 shear apart due to an axial force.

In the illustrated example, the blind holes 2217 and the blind holes 2218 are aligned circumferentially on the valve body 2210 of the nozzle-side valve 2200. The through-holes 2318 align with the blind holes 2218 and the notches 2317 align with the blind holes 2217 such that the shear pins 2420 and the anti-rotation pins 2450 align circumferentially when the nozzle-side valve 2200 and the tank-side valve 2300 are securely coupled together.

Further, in the illustrated example, the blind holes 2217 are spaced equidistantly apart from each other (e.g., by 180 degrees) about the circumference of the valve body 2210, and the blind holes 2218 are spaced equidistantly apart from each other (e.g., by 180 degrees) about the circumference of the valve body 2210. The blind holes 2217 are offset by the blind holes 2218 such that blind holes 2217, 2218 are equidistantly spaced apart from each other (e.g., by 90 degrees) about the circumference of the valve body 2210. Similarly, the notches 2317 and the through-holes 2318 are spaced equidistantly apart from each other (e.g., by 90 degrees) about the circumference of the valve body 2210.

As illustrated in FIGS. 30-32, the breakaway valve 2000 includes a ring 2470 and an omni-seal 2480 that extend circumferentially between the valve body 2410 and the valve body 2310 adjacent to the shear pins 2420 and the anti-rotation pins 2450. The ring 2470 and the omni-seal 2480 sealingly engage the valve body 2410 and the valve body 2310 to form a seal between the nozzle-side valve 2200 and the tank-side valve 2300 to prevent the blind holes 2217, the blind holes 2218, the notches 2317, and the through-holes 2318 from leaking material from the breakaway valve 2000. In the illustrated example, the omni-seal 2480 is oriented axially such that the omni-seal 2480 forms a radial seal. In other examples, the omni-seal 2480 is oriented inward such that the omni-seal 2480 forms a face seal.

In operation, the nozzle-side valve 2200 and the tank-side valve 2300 of the breakaway valve 2000 separate when (1) at least the threshold axial force is applied by pulling the nozzle 26 in a direction away from the storage tank 22 and/or (2) when at least the threshold torsional force is applied (e.g., by the operator 40) by rotating the nozzle-side valve 2200 relative to the tank-side valve 2300. For example, the shear pins 2420 shear apart and allow the nozzle-side valve 2200 and the tank-side valve 2300 to separate when at least the threshold axial force is applied to the breakaway valve 2000 (e.g., due to the vehicle 30 pulling away from the filling station 20 during the fill sequence). The anti-rotation pins 2450 and the shear pins 2420 shear apart and, in turn, allow the nozzle-side valve 2200 the tank-side valve 2300 to separate when at least the threshold torsional force is applied (e.g., unintentionally by the operator 40 during the fill sequence).

When the shear pins 2420 have broken apart, the nozzle-side valve 2200, which remains connected to the jacketed hose 24, is no longer securely coupled to the tank-side valve 2300, which remains connected to the jacketed hose 23. In turn, the nozzle-side valve 2200 decouples from the tank-side valve 2300, and the jacketed hose 24 is pulled apart from the jacketed hose 23. When the nozzle-side valve 2200 decouples from the tank-side valve 2300, the poppet 2240 reengages the valve seat 2230 to reclose the end of the nozzle-side valve 2200 and the poppet 2340 reengages the valve seat 2330 to reclose the end of the tank-side valve 2300. In the closed positions, the nozzle-side valve 2200 limits the amount of cryogenic fluid that can be discharged from a respective end of the jacketed hose 24 and the tank-side valve 2300 prevents cryogenic fluid from being discharged from the storage tank 22. Additionally, when the nozzle-side valve 2200 decouples from the tank-side valve 2300, (1) the jacket support 2270 remains secured to maintain the vacuum of the vacuum-insulation layer 2222 that extends from the nozzle-side valve 2200 and covers at least a portion of the jacketed hose 24 and (2) the jacket support 2370 remains secured to maintain the vacuum 2322 that extends from the tank-side valve 2300 and covers at least a portion of the jacketed hose 23.

What is claimed is:

1. A breakaway valve for use between a cryogenic tank and a nozzle for dispensing cryogenic fluid, comprising:

a first valve comprising a first valve body that includes a distal edge, wherein the first valve body defines one or more through-holes and one or more notches along the distal edge;

a second valve comprising a second valve body that defines one or more first blind holes and one or more second blind holes;

one or more shear pins each configured to extend through a respective one of the one or more through-holes and into a respective one of the one or more first blind holes, wherein the one or more shear pins are configured to shear apart when at least a predetermined axial force is applied to pull the second valve away from the first valve; and one or more anti-rotation pins each configured to extend through a respective one of the one or more notches and into a respective one of the one or more second blind holes, wherein the one or more anti-rotation pins are configured to withstand up to at least a predetermined torsional force to deter a torsional force from separating the second valve from the first valve, wherein each of the one or more anti-rotation pins has a thickness that is associated with the predetermined torsional force and is thicker than a narrowest portion of each of the one or more shear pins so that the one or more anti-rotation pins prevent the one or more shear pins from breaking when a torsional force less than the predetermined torsional force is applied; and wherein, when the first valve and the second valve are securely coupled together, the first valve and the second valve are in respective open positions to permit the cryogenic fluid to flow from the cryogenic tank and to the nozzle during a filling event; and wherein, when the first valve and the second valve are decoupled from each other in a breakaway event, the first valve and the second valve are in respective closed positions to limit emission of the cryogenic fluid.

2. The breakaway valve of claim 1, wherein each of the one or more notches includes an open end through which a respective one of the one or more anti-rotation pins is configured to slide when at least the predetermined axial force is applied so that the one or more anti-rotation pins do not interfere with the second valve separating from the first valve when the one or more shear pins shear apart and the one or more anti-rotation pins remain intact.

3. The breakaway valve of claim 1, wherein the one or more first blind holes and the one or more second blind holes are aligned circumferentially on the second valve such that the one or more shear pins and the one or more anti-rotation pins are aligned when the second valve is coupled to the first valve.

4. The breakaway valve of claim 1, wherein each of the one or more shear pins has a substantially hourglass cross-section that facilitates the one or more shear pins in consistently shearing when the predetermined axial force is applied.

5. The breakaway valve of claim 4, wherein each of the one or more anti-rotation pins has a substantially cylindrical cross-section.

6. The breakaway valve of claim 1, wherein each of the one or more shear pins includes a radially-inner portion, a radially-outer portion, and a radially-middle portion between the radially-inner portion and the radially-outer portion.

7. The breakaway valve of claim 6, wherein the radially-inner portion is wider than the radially-outer portion, and wherein the radially-outer portion is wider than the radially-middle portion.

8. The breakaway valve of claim 1, wherein, each of the one or more shear pins is press fit into a respective one of the one or more first blind holes.

9. The breakaway valve of claim 1, further comprising a respective shear-pin ring for each of the one or more shear pins that is press fit between the respective shear pin and the first valve body in a respective one of the one or more through-holes.

10. The breakaway valve of claim 1, further comprising an omni-seal and a ring that are configured to extend circumferentially between and engage the second valve body and the first valve body adjacent to the one or more shear pins and the one or more anti-rotation pins to form a sealed connection between the second valve and the first valve.

11. The breakaway valve of claim 1, further comprising a sleeve configured to be slidably positioned over the one or more shear pins and the one or more anti-rotation pins to retain the one or more shear pins and the one or more anti-rotation pins in place.

12. The breakaway valve of claim 1, wherein the first valve is a nozzle-side valve fluidly connected to the nozzle and the second valve is a tank-side valve fluidly connected to the cryogenic tank.

13. A breakaway valve for use between a cryogenic tank and a nozzle for dispensing cryogenic fluid, comprising:

a tank-side valve configured to be fluidly connected to the cryogenic tank, the tank-side valve comprising a tank-side valve body that includes a distal edge, wherein the tank-side valve body defines one or more through holes and one or more notches along the distal edge;

a nozzle-side valve configured to be fluidly connected to the nozzle, the nozzle-side valve comprising a nozzle-side valve body that defines one or more first blind holes and one or more second blind holes;

one or more shear pins each configured to extend through a respective one of the one or more through holes and into a respective one of the one or more first blind holes, wherein the one or more shear pins are configured to shear apart when at least a predetermined axial force is applied to pull the nozzle-side valve away from the tank-side valve; and one or more anti-rotation pins each configured to extend through a respective one of the one or more notches and into a respective one of the one or more second blind holes, wherein the one or more anti-rotation pins are configured to withstand up to at least a predetermined torsional force to deter a torsional force from separating the nozzle-side valve from the tank-side valve, wherein each of the one or more anti-rotation pins has a thickness that is associated with the predetermined torsional force and is thicker than a narrowest portion of each of the one or more shear pins so that the one or more anti-rotation pins prevent the one or more shear pins from breaking when a torsional force less than the predetermined torsional force is applied; and wherein, when the tank-side valve and the nozzle-side valve are securely coupled together, the tank-side valve and the nozzle-side valve are in respective open positions to permit the cryogenic fluid to flow from the cryogenic tank and to the nozzle during a filling event; and wherein, when the tank-side valve and the nozzle-side valve are decoupled from each other in a breakaway event, the tank-side valve and the nozzle-side valve are in respective closed positions to prevent the cryogenic fluid from being emitted.

14. The breakaway valve of claim 13, wherein each of the one or more notches includes an open end through which a respective one of the one or more anti-rotation pins is configured to slide when at least the predetermined axial force is applied so that the one or more anti-rotation pins do not interfere with the nozzle-side valve separating from the tank-side valve when the one or more shear pins shear apart and the one or more anti-rotation pins remain intact.

15. The breakaway valve of claim 13, wherein the one or more first blind holes and the one or more second blind holes are aligned circumferentially on the nozzle-side valve such that the one or more shear pins and the one or more anti-rotation pins are aligned when the nozzle-side valve is coupled to the tank-side valve.

16. The breakaway valve of claim 13, wherein each of the one or more anti-rotation pins has a substantially rectangular cross-section, and wherein each of the one or more shear pins has a substantially hourglass cross-section that facilitates the one or more shear pins in consistently shearing when the predetermined axial force is applied.

17. The breakaway valve of claim 13, further comprising an omni-seal and a ring that are configured to extend circumferentially between and engage the nozzle-side valve body and the tank-side valve body adjacent to the one or more shear pins and the one or more anti-rotation pins to form a sealed connection between the nozzle-side valve and the tank-side valve.

18. The breakaway valve of claim 13, further comprising a sleeve configured to be slidably positioned over the one or more shear pins and the one or more anti-rotation pins to retain the one or more shear pins and the one or more anti-rotation pins in place.

* * * * *